United States Patent
Eronen et al.

(10) Patent No.: US 9,792,711 B2
(45) Date of Patent: *Oct. 17, 2017

(54) RELEVANCE BASED VISUAL MEDIA ITEM MODIFICATION

(71) Applicant: Nokia Technologies Oy, Espoo (FI)

(72) Inventors: Antti Eronen, Tampere (FI); Jussi Artturi Leppanen, Tampere (FI); Arto Juhani Lehtiniemi, Lempaala (FI); Ville-Veikko Mattila, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/146,231

(22) Filed: May 4, 2016

(65) Prior Publication Data

US 2016/0253834 A1 Sep. 1, 2016

Related U.S. Application Data

(63) Continuation of application No. 14/060,284, filed on Oct. 22, 2013, now Pat. No. 9,367,939.

(51) Int. Cl.
G06K 9/00 (2006.01)
G06T 11/60 (2006.01)
G11B 27/034 (2006.01)
G11B 27/28 (2006.01)
H04N 5/262 (2006.01)
H04N 5/232 (2006.01)
(Continued)

(52) U.S. Cl.
CPC .............. G06T 11/60 (2013.01); G06K 9/00 (2013.01); G06K 9/00624 (2013.01); G11B 27/034 (2013.01); G11B 27/28 (2013.01); H04N 5/142 (2013.01); H04N 5/23219 (2013.01); H04N 5/23293 (2013.01); H04N 5/2621 (2013.01); H04N 5/2356 (2013.01)

(58) Field of Classification Search
CPC ......................... G06K 9/00624; G06T 7/0079
See application file for complete search history.

(56) References Cited

U.S. PATENT DOCUMENTS 8,520,967 B2    8/2013  Bilcu et al. .................... 382/254
9,367,939 B2 *  6/2016  Eronen ................ G11B 27/034
(Continued)

FOREIGN PATENT DOCUMENTS

JP      20133083689 A   5/2013
KR      20120057131 A   6/2012
KR      20120078290 A   7/2012

OTHER PUBLICATIONS

Sande. Steven, "Lytro Light Field Camera: Hands-On With the Future of Photography," http://www.lytro.com, Mar. 5, 2012, 8 pages/.

Primary Examiner — Utpal Shah
(74) Attorney, Agent, or Firm — Harrington & Smith

(57) ABSTRACT

A method that receives a visual media item and determines an identity of at least one intended viewer of the visual media item is disclosed. The method may further identify a visual representation of an object that is comprised by the visual media item and determine a relevance of the object based, at least in part, on the identity. The method may further generate a modified visual media item such that the modified visual media item differs from the visual media item, at least, by visual emphasis of the visual representation of the object.

20 Claims, 11 Drawing Sheets

(51) Int. Cl.
*H04N 5/14* (2006.01)
*H04N 5/235* (2006.01)

(56) References Cited

U.S. PATENT DOCUMENTS

| | | | |
|---|---|---|---|
| 2003/0039380 A1 | 2/2003 | Sukegawa et al. | 382/118 |
| 2003/0091239 A1 | 5/2003 | Imagawa et al. | 382/232 |
| 2004/0156535 A1 | 8/2004 | Goldberg et al. | 382/115 |
| 2006/0193509 A1 | 8/2006 | Criminisi et al. | 382/154 |
| 2008/0219493 A1 | 9/2008 | Tadmor | 382/100 |
| 2008/0259154 A1 | 10/2008 | Garrison et al. | 348/14.01 |
| 2008/0297588 A1 | 12/2008 | Kurtz et al. | 348/14.08 |
| 2009/0003708 A1 | 1/2009 | Steinberg et al. | 382/190 |
| 2009/0150330 A1 | 6/2009 | Gobeyn et al. | 707/1 |
| 2009/0210946 A1 | 8/2009 | Cohen et al. | 726/27 |
| 2010/0007796 A1 | 1/2010 | Yamaji et al. | 348/588 |
| 2011/0202968 A1 | 8/2011 | Nurmi | 726/1 |
| 2012/0007939 A1 | 1/2012 | Michrowski et al. | 348/14.07 |
| 2012/0051658 A1 | 3/2012 | Tong et al. | 382/224 |
| 2012/0081554 A1 | 4/2012 | Berman et al. | 348/207.1 |
| 2012/0249550 A1 | 10/2012 | Akeley et al. | 345/419 |
| 2013/0169760 A1 | 7/2013 | Watts | 348/47 |
| 2013/0226711 A1 | 8/2013 | Wu et al. | 705/14.69 |
| 2013/0235028 A1 | 9/2013 | Giencke et al. | 345/419 |
| 2013/0311469 A1 | 11/2013 | Kim | 707/737 |
| 2014/0160340 A1 | 6/2014 | Farnand et al. | 348/333.11 |
| 2014/0176663 A1 | 6/2014 | Cutler et al. | 348/14.07 |
| 2014/0181630 A1 | 6/2014 | Monney et al. | 715/232 |
| 2014/0211034 A1 | 7/2014 | Tanaka | 348/218.1 |
| 2014/0233853 A1 | 8/2014 | Fransson et al. | 382/173 |
| 2015/0113661 A1 | 4/2015 | Mishra | 726/26 |

\* cited by examiner

RELEVANCE BASED VISUAL MEDIA ITEM MODIFICATION

This is a continuation patent application of U.S. patent application Ser. No. 14/060,284, now U.S. Pat. No. 9,367,939, filed on Oct. 22, 2013.

TECHNICAL FIELD

The present application relates generally to modification of a visual media item.

BACKGROUND

As electronic apparatuses have become more popular, more people have become dependent upon their electronic apparatuses for recording visual media, sharing visual Media, editing visual media, etc. In many circumstances, it may be difficult for a user to modify visual media to suit their viewing desires. It may be desirable to provide for a simple manner for visual media items to be modified in a manner that is desirable to the viewer of the visual media item.

SUMMARY

Various aspects of examples of the invention are set out in the claims.

One or more embodiments may provide an apparatus, a computer readable medium, a non-transitory computer readable medium, a computer program product, and a method for receiving a visual media item, determining an identity of at least one intended viewer of the visual media item, identifying a visual representation of an object that is comprised by the visual media item, determining a relevance of the object based, at least in part, on the identity, and generating a modified visual media item such that the modified visual media item differs from the visual media item, at least, by visual emphasis of the visual representation of the object.

One or more embodiments may provide an apparatus, a computer readable medium, a computer program product, and a non-transitory computer readable medium having means for receiving a visual media item, means for determining an identity of at least one intended viewer of the visual media item, means for identifying a visual representation of an object that is comprised by the visual media item, means for determining a relevance of the object based, at least in part, on the identity, and means for generating a modified visual media item such that the modified visual media item differs from the visual media item, at least, by visual emphasis of the visual representation of the object.

In at least one example embodiment, the difference of visual emphasis relates to the visual representation of the object comprised by the modified visual media item being emphasized to a greater extent than the visual representation of the object comprised by the visual media item.

In at least one example embodiment, generation of the modified visual media item relates to performance of a visual effect on the visual representation of the object.

In at least one example embodiment, the visual effect relates to emphasis of the visual representation of the object.

In at least one example embodiment, a magnitude of the visual effect is based, at least in part, on the relevance.

In at least one example embodiment, a magnitude of the visual effect is based, at least in part, on a magnitude of the relevance.)

In at least one example embodiment, the visual effect relates to an increased brightness effect.

In at least one example embodiment, the visual effect relates to a sharpening visual effect.

One or more example embodiments further perform generation of the modified visual media item relates to performance of a visual effect on at least one part of the visual media item that fails to include the visual representation of the object.

In at least one example embodiment, the visual effect relates to de-emphasis of the region.

In at least one example embodiment, the region relates to a background of the visual media item.

In at least one example embodiment, the background relates to a part of the visual media item that fails to relate to the visual representation of the object.

In at least one example embodiment, the region relates to a visual representation of a different object.

In at least one example embodiment, generation of the modified visual media item relates to preclusion of performance of the visual effect on at least one part of the visual media item that includes the visual representation of the object.

In at least one example embodiment, a magnitude of the visual effect is based, at least in part, on the relevance.

In at least one example embodiment, a magnitude of the visual effect is based, at least in part, on a magnitude of the relevance.

In at least one example embodiment, the visual effect relates to a decreased lighting visual effect.

In at least one example embodiment, the visual effect relates to a dulling visual effect.

In at least one example embodiment, the visual media item relates to a hyperfocal visual content.

In at least one example embodiment, the visual media item relates to a multiframe high dynamic range processed image.

In at least one example embodiment, the visual media item relates to a multiframe extended depth of field image.

In at least one example embodiment, the visual media item is received from a camera module.

In at least one example embodiment, the visual media item relates to a media item that comprises visual content.

In at least one example embodiment, the visual media item comprises at least one of an image, or a video.

In at least one example embodiment, the image relates to at least one of a multiframe image, or a single frame image.

In at least one example embodiment, the visual media item is received from a separate apparatus.

In at least one example embodiment, the image is received from at least one memory.

In at least one example embodiment, the identity relates to information that designates at least one characteristic of the intended viewer.

In at least one example embodiment, the identity relates to at least one of a name associated with the intended viewer, an identification code that designates the intended viewer, or contact information associated with the intended viewer.

In at least one example embodiment, the contact information relates to at least one of a messaging address, a phone number, or a uniform resource locator.

In at least one example embodiment, the identity relates to a social networking account designation.

In at least one example embodiment, the intended viewer relates to a person for which the visual media item is modified to suit.

In at least one example embodiment, determination of the identity of the intended viewer of the visual media item relates to a presumption that a user of the apparatus is the intended viewer, and retrieval of identity information associated with the user of the apparatus.

In at least one example embodiment, the retrieval of identity information relates to retrieval from memory.

In at least one example embodiment, the identity relates to an identity associated with a user account that is active when the visual media item is received.

In at least one example embodiment, determination of the visual representation of the object comprises utilization of at least one region of interest detection module.

In at least one example embodiment, determination of the visual representation of the object comprises utilization of at least one object analysis module.

In at least one example embodiment, the determination of the visual representation of the object comprises image segmentation and image recognition of the object by way of image recognition.

In at least one example embodiment, the object relates to a person and determination of the visual representation of the object relates to facial recognition.

One or more example embodiments further perform determination of information indicative of at least one environmental factor associated with the visual media item, wherein at least one of the identification of the object or determination of relevance of the object is based, at least in part, on the environmental factor.

In at least one example embodiment, the determination of the information indicative of the environmental factor associated with the visual media item comprises retrieval of metadata associated with the visual media item.

In at least one example embodiment, the determination of the information indicative of the environmental factor associated with the visual media item comprises receipt of sensor information indicative of the environmental factor.

In at least one example embodiment, the environmental factor relates to a geographical position.

In at least one example embodiment, the environmental factor relates to a direction.

In at least one example embodiment, the identification of the visual representation of the object is based, at least in part, on the environmental factor.

One or more example embodiments further perform determination that the object corresponds with at least one point of interest associated with the environmental factor, wherein the identification of the visual representation of the object is based, at least in part, on the determination that the object corresponds with at least one point of interest associated with the environmental factor.

In at least one example embodiment, the point of interest relates to at least one of a street, a building, or a landmark.

In at least one example embodiment, determination of the relevance of the object relates to correlation of the object to information indicative of a relationship between the identity and the object.

In at least one example embodiment, the relevance relates to a value indicative of existence of a relationship between the identity and the object.

In at least one example embodiment, a value indicative of existence of a relationship between the identity and the object relates to a value that is greater than a value indicative of absence of a relationship between the identity and the object.

In at least one example embodiment, determination of the relevance of the object relates to a lack of correlation of the object to information indicative of a relationship between the identity and the object.

In at least one example embodiment, the relevance relates to a value indicative of absence of a relationship between the identity and the object.

In at least one example embodiment, a value indicative of absence of a relationship between the identity and the object relates to a value that is less than a value indicative of existence of a relationship between the identity and the object.

In at least one example embodiment, the object relates to a person and information indicative of a relationship relates to information indicative of a social connection between the identity and the person.

In at least one example embodiment, the information indicative of the social connection relates to contact information.

In at least one example embodiment, the contact information relates to contact information associated with a social networking account, and the social connection relates to a connection between the contact information and the identity by way of the social network.

In at least one example embodiment, the identity relates to a user of the apparatus and the contact information relates to contact information comprised by a contact list associated with the apparatus.

One or more example embodiments further perform receipt of the information indicative of the relationship between the identity and the object.

In at least one example embodiment, the information indicative of the relationship is received from at least one external apparatus.

In at least one example embodiment, the external apparatus relates to a social networking server.

In at least one example embodiment, the external apparatus relates to a server that provides information associated with the identity.

In at least one example embodiment, the information indicative of the relationship relates to profile information associated with the identity.

In at least one example embodiment, profile information relates to information indicative of preferences in relation to one or more objects.

One or more example embodiments further perform determination of at least one environmental factor associated with the apparatus, wherein the identity relates to a user of the apparatus and the information indicative of a relationship relates to the environmental factor.

In at least one example embodiment, the information indicative of a relationship relates to historical information associated with the identity.

In at least one example embodiment, the information indicative of the relationship relates to hobby information associated with the identity.

In at least one example embodiment, the information indicative of the relationship relates to age information associated with the identity.

In at least one example embodiment, the information indicative of the relationship relates to gender information associated with the identity.

In at least one example embodiment, the information indicative of the relationship relates to industry information associated with the identity.

In at least one example embodiment, determination of relevance comprises determination of a role of the object in the visual media.

In at least one example embodiment, role of the object relates to a level of importance of the object with respect to the visual media.

In at least one example embodiment, determination of the role of the object is based, at least in part, on at least one of a size of the visual representation of the object or a position of the visual representation of the object.

In at least one example embodiment, a central position relates to a greater relevance than a non-central position.

In at least one example embodiment, a larger visual representation of the object relates to a greater relevance than a smaller visual representation of the object.

One or more example embodiments further perform sending the modified visual media item to a recipient, wherein the intended viewer is the recipient.

One or more example embodiments further perform sending the visual media item to the recipient.

In at least one example embodiment, determination of the identity comprises receipt of information indicative of an input that designates the identity.

One or more example embodiments further perform causation of display of the modified visual media item.

In at least one example embodiment, the input relates to selection of an interface item associated with the identity.

In at least one example embodiment, the interface item relates to at least one of a contact interface item associated with the identity, or an image associated with the identity.

One or more example embodiments further perform causation of display of the visual media item, wherein the input relates to selection of a part of the visual media item that corresponds with a visual representation of the identity.

In at least one example embodiment, the selection relates to a drag input indicative of dragging the interface item to a position that corresponds with a position of the displayed visual media item.

In at least one example embodiment, identification of the visual representation of the object is performed absent receipt of input indicative of the visual representation of the object.

One or more example embodiments further perform identification of a visual representation of a different object, and identification of a different relevance of the different object based, at least in part, on the identity.

In at least one example embodiment, the different relevance is greater than the relevance, and the difference of visual emphasis relates to the visual representation of the object comprised by the modified visual media item being emphasized to a lesser extent than the visual representation of the object comprised by the visual media item.

In at least one example embodiment, generation of the modified visual media item is performed such that the modified visual media item fails to differ from the visual media item, at least, by visual emphasis of the visual representation of the different object being emphasized similarly to the visual representation of the different object comprised by the visual media item.

In at least one example embodiment, generation of the modified visual media item is performed such that the modified visual media item differs from the visual media item, at least, by visual emphasis of the visual representation of the different object being emphasized to a greater extent than the visual representation of the different object comprised by the visual media item.

BRIEF DESCRIPTION OF THE DRAWINGS

For a more complete understanding of embodiments of the invention, reference is now made to the following descriptions taken in connection with the accompanying drawings in which.

DETAILED DESCRIPTION OF THE DRAWINGS

Figure 1:
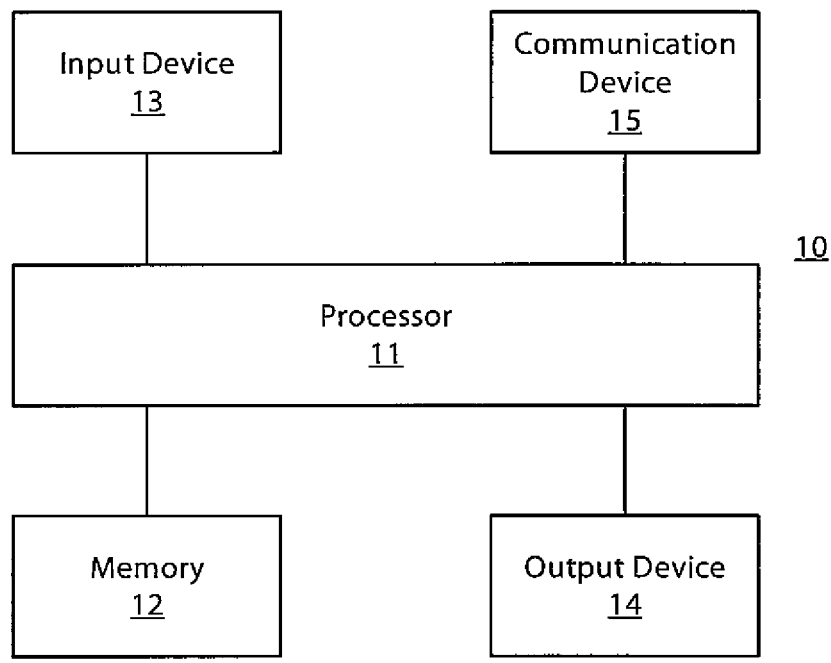
FIG. 1 is a block diagram showing an apparatus according to an example embodiment.

An embodiment of the invention and its potential advantages are understood by referring to FIGS. 1 through 10 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a global positioning system (GPS) apparatus, an automobile, a kiosk, an electronic table, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ embodiments of regardless of their intent to provide mobility. In this regard, even though embodiments may be described in conjunction with mobile applications, it should be understood that embodiments may be utilized in conjunction with a variety of other applications, both in the mobile communications industries and outside of the mobile communications industries. For example, the apparatus may relate to, at least part of, a non-carryable apparatus, such as a large screen television, a kiosk, an automobile, and/or the like.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus that comprises a display, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may relate to information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

Figure 2A:
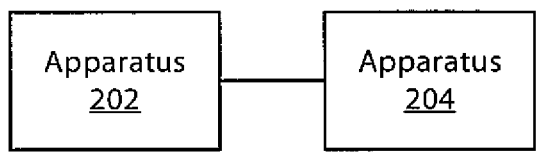
FIGS. 2A-2B are diagrams illustrating apparatus communication according to at least one example embodiment.
Figure 2B:
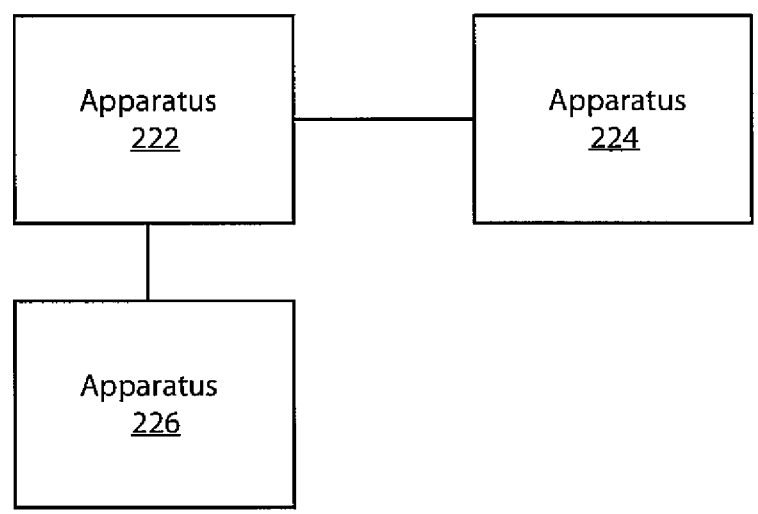

FIGS. 2A-2B are diagrams illustrating apparatus communication according to at least one example embodiment. The examples of FIGS. 2A-2B are merely examples and do not limit the scope of the claims. For example, number of apparatuses may vary, communication path may vary, communication channels may vary, and/or the like.

As electronic apparatuses have become more prolific, there has been an increasing desire for users to utilize multiple electronic apparatuses collaboratively. For example, a user may have a plurality of electronic apparatuses. In such an example, the user may desire to share information from an electronic apparatus to another electronic apparatus, to store information on another electronic apparatus to be accessed by additional electronic apparatuses, and/or the like. For example, the user may have content stored on an apparatus and desire to send a copy of the content to another apparatus. In such an example, the other apparatus may be the user's apparatus or a different user's apparatus and the other apparatus may be a server.

In at least one example embodiment, an apparatus may communicate with another apparatus by way of a communication channel. In at least one example embodiment, a communication channel relates to, at least partial, allocation of communication resources between an apparatus and another apparatus. For example, a communication channel may relate to a frequency designation, a channel designation, a sub-channel designation, a frame designation, and/or the like. An apparatus may have a plurality of communication channels. For example, an apparatus may have one or more communication channels with one or more other apparatuses, with one or more communication networks, and/or the like. For purposes of clarity, a communication channel may be referred to in terms of an apparatus involved in the communication channel. For example, a communication channel associated with an apparatus may be referred to as an apparatus communication channel, a communication channel associated with a separate apparatus may be referred to as a separate apparatus communication channel, a communication channel associated with a communication network may be referred to as a communication network communication channel, and/or the like.

In the example of FIG. 2A, apparatus 202 communicates with apparatus 204 by way of a communication channel. For example, apparatus 202 may send information to apparatus 204, may receive information from apparatus 204, and/or the like. For example, apparatus 202 may send a message to apparatus 204.

In some circumstances, apparatus 202 and apparatus 204 may communicate directly with each other. In other circumstances, apparatus 202 and 204 may communicate indirectly, for example by way of a communication network. In at least one example embodiment, a communication network relates to one or more apparatuses that provide for communication between an apparatus and another apparatus. For example, the communication network may comprise a plurality of communication apparatuses. A communication apparatus may be any apparatus associated with facilitation of communication in a communication network. For example, a communication apparatus may relate to an access point for the communication network, such as a wireless access point, a cellular base station, a Bluetooth access point, and/or the like. In another example, a communication network apparatus may relate to an apparatus utilized for communication within the communication network, such as a hub, a router, a switch, and/or the like. In at least one example embodiment, an apparatus may be in communication with a communication network by way of a communication channel with a communication apparatus of the communication network. In at least one example embodiment, an apparatus that does not have a communication channel with a communication apparatus may not be in communication with the communication apparatus. In some circumstances, an apparatus and another apparatus may communicate by way of a communication network by way of the same communication apparatus. For example, an apparatus may communicate with another apparatus, by way of a cellular network, where the apparatus and the other apparatus are in communication with the same base station of the cellular network. In such an example, the apparatus and the other apparatus may be within a region that is covered by the base station.

In some circumstances, an apparatus may be in communication with more than one other apparatus. For example, an apparatus may be in communication with another apparatus of a user, and in communication with a server. For example, the apparatus may receive information from the server that may affect the manner in which the apparatus communicates with the other apparatus. For example, the apparatus may receive information from the server for communication with the other apparatus, such as data to be shared with the other apparatus. In another example, the apparatus may receive information associated with communication with the other apparatus, such as contact information, address information, user information of the user associated with the other apparatus, and/or the like. For example, the server may relate to a social networking server that comprises contact information of the other user. In such an example the apparatus may receive information indicative of contact information associated with the other user from the server. The apparatus may utilize such contact information for sending information to the other apparatus, for determining which information to send to the other user, and/or the like.

In the example of FIG. 2B, the apparatus 222 is in communication with apparatus 224 and apparatus 226. Apparatus 226 may be a server, and apparatus 224 may be an apparatus of a particular user. The user of apparatus 222 may desire to share information with the particular user. In such an example, apparatus 222 may receive information associated with communication with apparatus 224 from apparatus 226. In this manner, apparatus 222, may communicate with apparatus 224 by way of information received from apparatus 226.

Figure 3A:
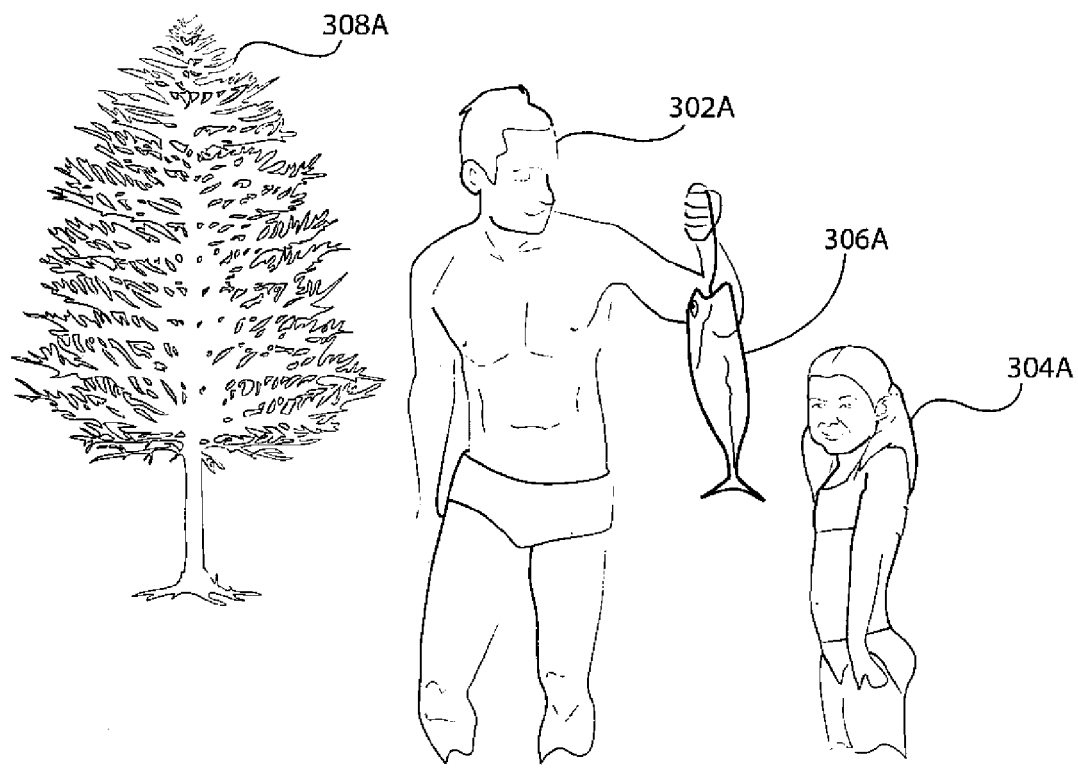
FIGS. 3A-3C are diagrams illustrating visual media items according to at least one example embodiment.
Figure 3B:
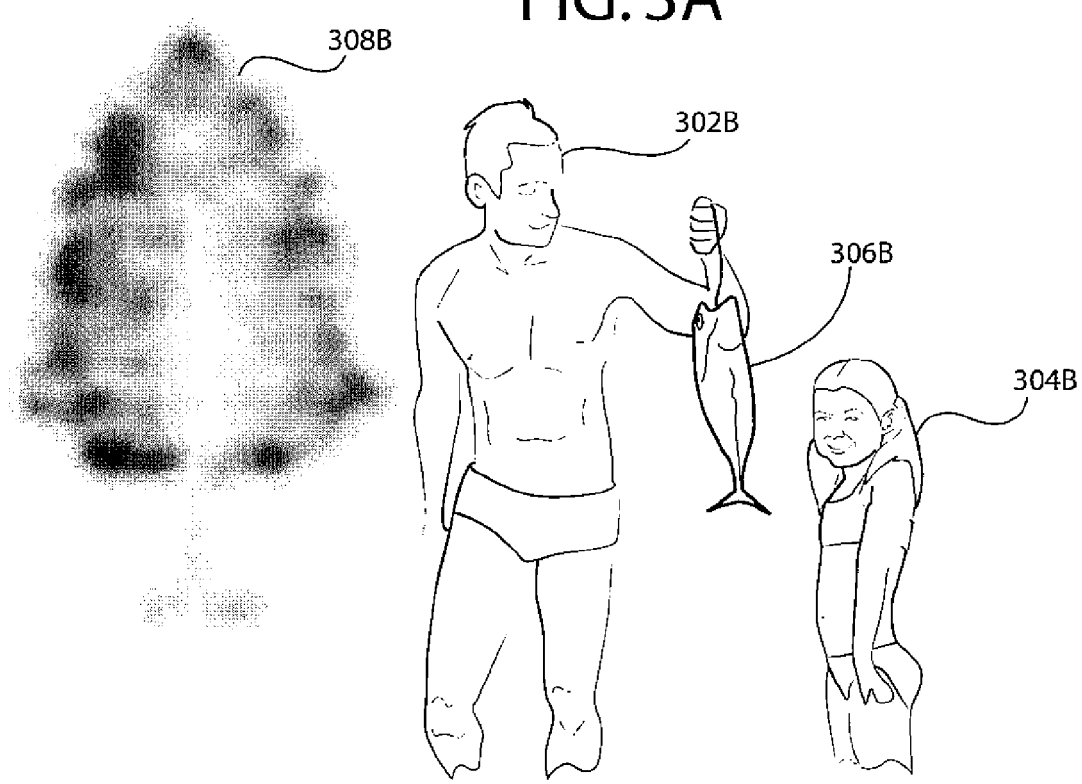
Figure 3C:
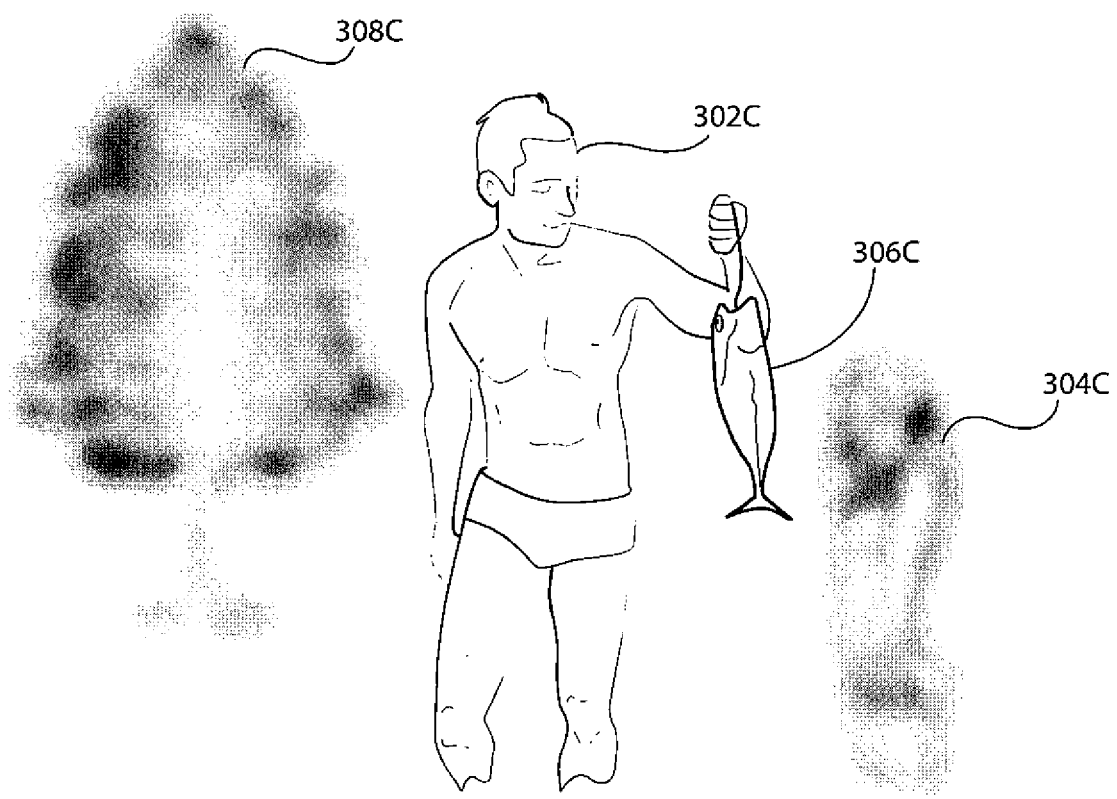

FIGS. 3A-3C are diagrams illustrating visual media items according to at least one example embodiment. The examples of FIGS. 3A-3C are merely examples and do not limit the scope of the claims. For example, visual representations may vary, number of objects may vary, proportionality of the visual media item may vary, and/or the like.

As display capabilities of apparatus have improved, users have become increasingly reliant on such apparatuses for viewing visual material. For example, many users spend vast amounts of time viewing images and videos on their electronic apparatuses. As such uses of visual content has become increasingly popular, it has also become increasingly popular for users to share their experiences with other users by way of such apparatuses. For example, a user may send an image to a friend to allow the friend to see a recent event. In this manner, visual communication has become an increasingly relevant manner of communication by many users.

However, in some circumstances, users may have their own individualized interest in media content that is shared with them. For example, two different users may enjoy the same image for different reasons. In such an example, one of the users may appreciate the image for the scenery that the image shows, while the other user may appreciate the image for the people that are depicted in the image. In such circumstances, it may be desirable to enhance the experience of a user viewing visual content by tailoring the visual content to better suit the particular interests of the user who is viewing the image. For example, the user who enjoys the background of the image may appreciate a version of the image that emphasizes the background or de-emphasizes the people depicted in the image. Similarly, the user who enjoys the people of the same image may appreciate a version of the image that emphasizes the depictions of the people or de-emphasizes the background. In this manner, such tailoring of the image may provide a better user experience for such users by automatically adjusting the content of the image to better suit the desires of such users. Such adjustment may be based, at least in part, on information that allows for an inference regarding what such a user may appreciate in the visual content, what such a user may fail to appreciate in such an image, and/or the like.

There are many different types of media items that an apparatus may render to a user. For example, an apparatus may render visual media items, audible media items, tactile media items, and/or the like. In at least one example embodiment, a media item relates to a collection of data that, when rendered, allows an apparatus to convey the media represented by the data to the user in a manner that allows the user to experience the information represented by the data by way of the user's senses. For example, a visual media item may be a visual item that provides graphical imagery that a user may see. For example, the visual media item may be a video, an image, and/or the like. For simplicity, a video may be described in terms of a collection of images that are rendered in succession to each other. Therefore, the description of images herein may also be applicable to images represented within a video.

The apparatus may receive a visual media item from one or more sources. For example, the apparatus may receive a visual media item from a camera module, from memory, from a separate apparatus, and/or the like. For example, the apparatus may comprise a camera module, and the visual media item may be received from the camera module. For example, the visual media item may be an image captured by the apparatus, a video captured by the apparatus, and/or the like. In another example, the apparatus may receive the visual media item from a separate apparatus, such as a server, an apparatus of another user, and/or the like. For example, the visual media item may be downloaded from a server, may be received in a message, may be shared in a repository, and/or the like. In still another example, the apparatus may have the visual media item stored in memory, and may receive the visual media item by retrieving the visual media item from memory.

In many circumstances, visual media items comprise hyperfocal visual content. In at least one example embodiment, hyperfocal visual content relates to visual content where differences in depth of the represented objects of the visual content fail to correlate with the object being out of focus. For example, a camera sensor having an associated smaller aperture may capture images that have a greater hyperfocal quality than captured by a camera sensor having an associated larger aperture. In this manner, a visual media item based on a single frame image may comprise hyperfocal visual content. In another example, a visual media item may comprise information associated with multiframe imaging. In at least one example embodiment, multiframe imaging relates to visual media items that are based on generation of an image from a plurality of images that have different properties. Multiframe imaging may refer to applications that combine several input images into one output image for increased visual quality. Multiframe imaging may comprise multiframe high dynamic range (HDR) imaging, multiframe extended-depth-of-field (EDOF) imaging, and/or the like. In at least one example embodiment, HDR is a process where several images are captured with different exposure times, gains, etc. and are merged together to obtain a single image with greater visible details. In at least one example embodiment, EDOF is a process where several images differently focused are combined in order to obtain an image in which objects at different depths are in focus.

In this manner, the visual media item may comprise visual content of various objects that are represented in the visual media item with similar clarity, similar emphasis, and/or the like. However, as previously described, it may be desirable to vary the representation of the objects comprised by the visual media item based, at least in part, on an intended viewer of the visual media item. In at least one example embodiment, an intended viewer relates to a person for which the visual media item is modified to suit. For example, the apparatus may determine an identity of an intended viewer of the visual media item and modify the visual media item based, at least in part, on of the identity of the intended viewer. In at least one example embodiment, the identity relates to information that designates at least one characteristic of the intended viewer. For example, the identity may relate to a name associated with the intended viewer, an identification code that designates the intended viewer, contact information associated with the intended viewer, and or the like. In at least one example embodiment, the contact information relates to a messaging address, a phone number, a uniform resource locator, and/or the like.

In some circumstances, a user may desire that his apparatus automatically modify visual media items when the user views them. For example, the user may desire to avoid viewing a visual media item in its original form, but may desire to view a modified version of the visual media item that emphasizes objects represented by the visual media item that interest the user. In such an example, the apparatus may determine the identity of the intended viewer to be the user of the apparatus. For example, determination of the identity of the intended viewer of the visual media item may be based, at least in part, on a presumption that a user of the apparatus. In this manner, the identity may relate to an identity associated with a user account that is active when a visual media item is received, is rendered, is viewed, and/or the like. In such an example, the apparatus may retrieve identity information associated with the user of the apparatus, and base the modified visual media item, at least in part, on the retrieved identity information. For example, the apparatus may retrieve the identity information from memory, from a repository, from an external apparatus, such as a server, and/or the like. It should be understood that determination of an intended viewer may vary. For example, the apparatus may, alternatively, or in addition, determine an intended viewer similarly as described regarding FIG. 7, FIG. 8, and/or the like.

In order to be able to modify representations of objects in the visual media item, the apparatus may identify one or more visual representations of objects comprised by the visual media item. For example, the apparatus may identify objects that are represented by the visual media item to determine whether or not to change emphasis of the object. It should be understood that there are many existing manners for identifying visual representations of objects in a visual media item, and that there will likely be many future manners for identifying visual representations of objects in a visual media item, and that such solutions do not necessarily limit the claims in any way.

In at least one example embodiment, the apparatus identifies a visual representation of an object that is comprised by the visual media item. The visual representation of the object may relate to a region of the visual media item that comprises visual information indicative of the object. In some circumstances, the identified visual representation may have a precise boundary that corresponds with a delineation between the object and other parts of the visual content. However, in some circumstances, it may be desirable for the visual representation of the object to be less precise than an exact delineation. For example, it may be desirable to reduce the amount of apparatus resources allocated for determination of the visual representation of the object by reducing the granularity of such determination. In this manner, the identified visual representation of the object may relate to a region that may include a majority of the visual representation of the object, but less than the entirety of the visual representation of the object. Similarly, the region may include, at least a part of, a visual representation of information that fails to correspond with the object, such as background information, a different object: and/or the like. In at least one example embodiment, identification of the visual representation of the object comprises identification of the object and the portion of the visual media item that corresponds with the identified object. For example, identification of the visual representation may comprise determination that a particular region of the visual media item comprises a visual representation of an object that has a particular identity, classification, definition, and/or the like.

In at least one example embodiment, the apparatus utilizes a region of interest detection module for determination of the visual representation of the object. In at least one example embodiment, the apparatus utilizes an object analysis module for determination of the visual representation of the object. For example, a region of interest detection and/or object analysis module may be capable of analyzing the content of images or video frames and recognizing objects, such as persons, animals, vehicles, buildings, small items, and so on in the content. Such detection and/or analysis may, for example, be performed by way of image segmentation, analysis, and image recognition methods. For example, the apparatus may utilize face detection to detect and recognize faces in the image. In another example, the apparatus may utilize face recognition to determine an identity of one or more people in the image.

In some circumstances, it may be desirable to allow the user to assist in determination of a visual representation of an object. For example, the user may provide an input that indicates a part of the visual representation that relates to an object. In such an example, the user may identify a region of the visual media item for the apparatus to utilize in determining presence of an object in the visual media item. In another example, the user may provide an input that identifies an object that was determined from the visual representation. In such an example, the apparatus may have determined that a particular region of the visual media item comprises a visual representation of the object, and the user may perform an input that assists in identification of the object, such as selection of an object identity from a list of available object identities. In some circumstances, such a user input may relate to correction of a determined visual representation of an object. For example, such an input may correct a region associated with the object, an identity of the object, and/or the like.

In at least one example embodiment, the apparatus identifies the visual representation of the object absent receipt of input indicative of the visual representation of the object. For example, the apparatus may automatically identify the visual representation of the object absent any assistance from the user. In such an example, the user may desire such identification to occur without the user diverting any of his attention to performance of input for object identification.

As previously described, it may be desirable to modify the visual representation of an object based, at least in part, on the identity of the intended viewer. The modification of the visual representation of the object may be based, at least in part, on the relevance of the object to the intended viewer. For example, the apparatus may determine that the visual media item comprises visual representations of faces of identified people. In such an example, the modification of the visual representations of the identified people may be based, at least in part, on the relevance of the identified people to the intended viewer. For example, the apparatus may treat a visual representation of a family member differently that a visual representation of a stranger.

In at least one example embodiment, the apparatus determines a relevance of the object based, at least in part, on the identity of the intended viewer of the visual media item. The relevance, may relate to a value indicative of existence of a relationship between the identity of the intended viewer and the object. For example, a value indicative of existence of a relationship between the identity and the object relates to a value that is greater than a value indicative of absence of a relationship between the identity of the intended viewer and the object, and a value indicative of absence of a relationship between the identity of the intended viewer and the object may relate to a value that is less than a value indicative of existence of a relationship between the identity of the intended viewer and the object. However, in some embodiments, polarity of such a value may differ. In at least one example embodiment, determination of the relevance of the object relates to a lack of correlation of the object to information indicative of a relationship between the identity of the intended viewer and the object. In this manner, the relevance may also relate to a value indicative of absence of a relationship between the identity and the object.

In at least one example embodiment, the determination of the relevance of the object comprises correlation of the object to information indicative of a relationship between the identity of the intended viewer and the object. There may be many sources of information indicative of a relationship between the identity of the intended viewer and the object. For example, information indicative of a relationship between the person and the intended viewer may relate to contact information associated with an object that is a person. In such an example, information indicative of a relationship between the person and the intended viewer may relate to absence of the contact information, presence of the contact information and/or the like, in a contact list of the intended viewer. Such a contact list may relate to a phonebook, an external repository, a social networking contact list, and/or the like.

In at least one example embodiment the information indicative of a relationship relates to historical information associated with the identity of the intended viewer. The historical information may relate to past occurrences that may indicate presence or absence of a relationship.

For example, the information indicative of the relationship may relate to keywords related to user's recent activities, interests, comments, etc. from short messages, email, social networking communication, search queries, and/or the like. In such an example, if the intended viewer has recently been communicating about babies, the apparatus may determine that visual representations of babies are relevant for the intended viewer. In another example, the information indicative of the relationship may relate to places the intended viewer has visited in the past. For example, if the user has visited Helsinki Cathedral in the past, the apparatus may utilize the information indicative of the visit to the Helsinki Cathedral as information indicative of a relationship between the user and the Helsinki Cathedral. In still another example, the information indicative of the relationship may relate to the intended viewer's activities and/or interactions with objects in previously experienced images. For example, if a user consistently spends a longer time viewing images containing certain types of objects (such as flowers, for example), the system may determine that this object type is relevant to the user. Similarly, if the intended viewer has recently viewed images of a particular person presence of a visual representation of that particular person in a visual media item may be relevant to the intended viewer. In still another example, the information indicative of the relationship may relate to a web browser history. In such an example, if the intended viewer often views web pages containing certain types of objects, such as motorcycles, bicycles, trains, etc., visual representations of those types of objects may be determined to be relevant to the intended viewer.

In at least one example embodiment, the information indicative of the relationship relates to hobby information associated with the identity of the intended viewer. For example, if the intended viewer is a bird watcher then visual representations of birds may be relevant to the user. Similarly, if the user is a fan of a particular sport, visual representation of objects associated with that sport may be relevant to the user.

In at least one example embodiment, the information indicative of the relationship relates to demographical information that corresponds with an attribute of the identity of the intended viewer. For example, the information indicative of the relationship may relate to demographical object relevance information based on a demographic that may be applicable to the intended viewer. For example, the information indicative of the relationship may relate to identification of objects that are statistically associated with objects of interest to people who fit within a particular demographic.

In at least one example embodiment, the information indicative of the relationship relates to age information associated with the identity of the intended viewer. For example, the information indicative of the relationship may relate to demographic information associated with the age of the intended viewer. In such an example, if the intended viewer is young, objects demographically preferred by young users may be relevant to the intended viewer. For example, visual representations of toys may be relevant to children.

In at least one example embodiment, the information indicative of the relationship relates to gender information associated with the identity of the intended viewer. For example, the information indicative of the relationship may relate to demographic information associated with the gender of the intended viewer. In such an example, if the intended viewer is male, visual representations of objects which are generally interesting to male viewers may be relevant to the intended viewer. For example, visual representations of cars, tools, motorized vehicles, etc. may be relevant to a male viewer.

In at least one example embodiment, the information indicative of the relationship relates to industry information associated with the identity of the intended viewer. The industry information may relate to employment of the intended viewer, such as a company for which the intended viewer works, a field of work in which the intended viewer works, and/or the like. For example, visual representations of colleagues working in the same company/field/study of discipline may be relevant to the intended viewer. Similarly, potential trade partners of the company for which the intended viewer works may be relevant to the intended viewer.

In some circumstances, it may be desirable to consider the role of an object in the visual media item when determining relevance of the object to the intended viewer. For example, an object that plays a prominent role in an image may be more relevant to the intended viewer than an object that plays a less prominent role in the visual media item. In at least one example embodiment, the determination of relevance comprises determination of a role of the object in the visual media. The role of the object may relate to a level of importance of the object with respect to the visual media. In at least one example embodiment, determination of the role of the object is based, at least in part, on size of the visual representation of the object, position of the visual representation of the object, and/or the like. For example, a central position may indicate a greater relevance than a non-central position. In another example, a larger visual representation of the object may indicate a greater relevance than a smaller visual representation of the object. For example, a visual representation of a person having a large size and located in the middle of an image may indicate a more prominent role in the image than a visual representation of a person having a small size and located in the periphery of the image. In this manner, even if the person may be unknown to the intended viewer, the person may be relevant based, at least in part, on the role of the visual representation of the person in the image. Thus, the apparatus may compare the layout of segmented and recognized objects to different image layouts. Furthermore, the different image layouts may be associated with descriptions of objects, information regarding relative importance of objects, and/or the like. The apparatus may identify one or more layouts for the image from the set of comparison layouts based, at least in part on similarity. Moreover, the apparatus may identify the object(s) in the reference layouts based, at least in part, on similarity to the object of interest. The relevance for an object may then be determined based on the relevance of the corresponding objects in one or more of the identified image layouts. The apparatus may utilize such comparison to increase and/or decrease the relevance of visual representations of objects.

In this manner, role determination of a visual representation of an object may be used in combination with an intended viewer relationship to the visual representation of the object when determining relevance of the object.

As previously described, it may be desirable to modify a visual media item based, at least in part, on the relevance of visual representation of object to an intended viewer of the visual media object. In such circumstances, it may be desirable to change the emphasis of the visual representations of the object to reflect the relevance of the object to the intended viewer. In this manner, a modified visual media item may differ from the unmodified visual media item at least, by visual emphasis of the visual representation of the object. For example, the difference of visual emphasis may relate to the visual representation of the object comprised by the modified visual media item being emphasized to a greater extent than the visual representation of the object comprised by the visual media item. Such emphasis may relate to modification of the visual representation of the object and/or modification of a part of the visual media item that is beyond the visual representation of the object.

In at least one example embodiment, generation of the modified visual media item relates to performance of a visual effect on at least one part of the visual media item that fails to include the visual representation of the object. For example, the visual effect relates to de-emphasis of the region. The region may relate to a background of the visual media item. In at least one example embodiment, the background relates to a part of the visual media item that fails to relate to the visual representation of the object, that fails to relate to any other identified object, and/or the like. The region may relate to a visual representation of a different object. For example, emphasis of the visual representation of the object may relate to changing the visual representation of the object to become more emphasized, or changing the area surrounding the visual representation of the object to become less emphasized. For example, an image of a visual representation of an object in front of a background may be modified to emphasize the object to a greater extend by way of modifying the visual representation of the object to become more emphasized, modifying the background to become less emphasized, and/or the like. In this manner, generation of the modified visual media item may relate to preclusion of performance of the visual effect on at least one part of the visual media item that includes the visual representation of the object. Such visual effect may result in a change of emphasis of the visual representation of the object, even though the effect was not performed on the visual representation of the object.

In at least one example embodiment, modification of a part of the visual media item with respect to emphasis relates to an application of at least one visual effect to the part of the visual media item. The visual effect may relate to a level of emphasis for the visual representation of the object.

In at least one example embodiment, the level of sharpness of a visual representation of an object is indicative of emphasis. For example, a greater emphasized object may have a sharper visual representation than that of a less emphasized object. Similarly, a less emphasized object may have a more blurry visual representation than that of a greater emphasized object. Users may be familiar with this emphasis by way of general photography convention. For example, a primary subject of a photograph may often be in focus, while a less important element of the photograph may be out of focus. In this manner, users may be familiar with an association of lack of emphasis for blurred visual representations of objects.

In at least one example embodiment, a bokeh effect may be utilized to change emphasis of a visual representation of an object. In at least one example embodiment, a bokeh effect relates to modification of a visual representation that changes the amount of blur associated with the visual representation. In this manner, the effect may change the perception of whether the image was focused upon a particular object. For example, an increased bokeh effect may indicate a lack of focus, and consequently a lesser emphasis. Similarly, a reduced bokeh effect may indicate focus, and consequently a greater emphasis. For example, a bokeh effect may be applied to a visual representation of an object that is in focus to make the object appear to be out of focus.

In at least one example embodiment, a brightness effect may be utilized to change emphasis of a visual representation of an object. The brightness effect may relate to introduction of a light source, such as a glow effect, modification of a brightness level, and/or the like. For example, a decreased brightness may be indicative of de-emphasis of an object and an increased brightness may be indicative of emphasis of an object.

In a yet another example embodiment, a color related effect may be utilized to change emphasis of a visual representation of an object. For example, the object which is desired to be emphasized may be represented using colors whereas the object(s) which are desired to be de-emphasized may be represented with black and white. In another example, more prominent colors may be applied to the objects which are to be emphasized and less prominent colors may be applied to objects which are to be de-emphasized. In a yet another example, different filtering may be applied on the object to be emphasized and the objects or regions to be de-emphasized. Examples of possible filtering operations include low pass filtering, high pass filtering, band pass filtering, entropy filtering, and/or the like. In a yet another example embodiment, adding or reducing noise may be used to de-emphasize or emphasize objects. For example, noise may be added to regions or objects in the image which are to be emphasized.

In at least one example embodiment, a removal effect may be utilized to change emphasis of a visual representation of an object. The removal effect may relate to deletion an object, replacement of an object, and/or the like.

In at least one example embodiment one or more effects associated with emphasis and/or de-emphasis of an object may be based on one or more modification directives. In at least one example embodiment, a modification directive is a setting, a command, and/or the like, that designates at least one effect to be applied to cause emphasis and/or de-emphasis. The modification directive may relate to a style, colors, color depth, etc. of to apply in in relation to emphasis/de-emphasis of an object. The modification directive may be predetermined, user determinable, and/or the like. For example, a user may change a modification directive. In such an example, the apparatus may provide an interface that allows the user to change the modification directive, to set the modification directive, and/or the like. For example, the apparatus may provide such a user interface in conjunction with display of the media item. In this manner, when previewing a picture, the user may choose how an object is emphasized and/or de-emphasised for the receiver. The modification directive may be received from a separate apparatus, such as a separate apparatus from which the apparatus receives the media item. In at least one example embodiment, one or more modification directives may be applied to a particular media item. For example, a user may elect to apply a modification directive to a selected media item. In such an example, the user may drag an interface item that represents the modification directive onto the media item to cause modification of the media item to be performed in conformance with the modification directive. In at least one example embodiment, user selection of a modification directive for utilization regarding a particular media item may cause the apparatus to utilize the modification directive regarding later modified media items.

In some circumstances, it may be desirable to base the amount of modification of a visual representation of an object on a magnitude of the relevance of the object to the intended viewer. In at least one example embodiment, a magnitude of the visual effect is based, at least in part, on the relevance. For example, the magnitude of the visual effect is based, at least in part, on a magnitude of the relevance. For example, it may be desirable for a degree of blurring to depend on the degree relevance of the object to the intended viewer. In such an example, a small degree of blurring may be applied to visual representations of objects which may be irrelevant to the intender viewer, and a larger degree of blurring may be applied to visual representations of objects which may be even more irrelevant.

For example, relevance may be determined by way of a social distance. In at least one example embodiment, a social distance relates to a quantification of social closeness between people, such as counting social links between people. The family members of a person may belong to a first category of social distance. The person's own contacts may belong to a second category of social distance, which may be most important after the family members. The contacts of contacts may belong to a third category of social distance, etc. In such an example, a blurring effect of a visual representation of a family member (if any) may be lesser than a blurring effect of a contact of the person.

FIG. 3A is a diagram illustrating a visual media item according to at least one example embodiment. Even though the example of FIG. 3A indicates a single image, the example of FIG. 3A may relate to a single image, a plurality of images, a video, and/or the like. It can be seen that the visual media item of FIG. 3A comprises visual representation 302A of a man, visual representation 304A of a little girl, visual representation 306A of a fish that the man is holding, and visual representation 308A of a tree that is included in the scene of the image. It can be seen that each of the visual representations 302A, 304A, 306A, and 308A are in focus. In this manner, the visual media item of FIG. 3A may comprise hyperfocal visual content.

FIG. 3B is a diagram illustrating a visual media item according to at least one example embodiment. FIG. 3B represents a changed version of the visual media item of FIG. 3A. In the example of FIG. 3B, visual representation 302B is based, at least in part, on visual representation 302A, visual representation 304B is based, at least in part, on visual representation 304A, visual representation 306B is based, at least in part, on visual representation 306A, and visual representation 308B is based, at least in part, on visual representation 308A. It can be seen that visual representations 302B, 304B, and 306B are emphasized in FIG. 3B by way of application of a bokeh effect on visual representation 308B. In this manner, a viewer may perceive emphasis of visual representations 302B, 304B, and 306B.

FIG. 3C is a diagram illustrating a visual media item according to at least one example embodiment. FIG. 3C represents a changed version of the visual media item of FIG. 3A. In the example of FIG. 3C, visual representation 302C is based, at least in part, on visual representation 302A, visual representation 304C is based, at least in part, on visual representation 304A, visual representation 306C is based, at least in part, on visual representation 306A, and visual representation 308C is based, at least in part, on visual representation 308A. It can be seen that visual representations 302C and 306C are emphasized in FIG. 3C by way of application of a bokeh effect on visual representation 304C and visual representation 308C. In this manner, a viewer may perceive emphasis of visual representations 302C and 306C.

To aid in clarification of possible scenarios where an apparatus may generate a modified visual representation, such as illustrated in FIGS. 3B and 3C, an example scenario will be described. However, it should be understood that such scenario is intended merely to clarify circumstances where such modification may be desirable, and does not necessarily limit the claims in any way. In an example scenario, a user of an apparatus, John captured the image of FIG. 3A while fishing with John's friend, Mike, who is represented in the image by visual representation 302A. The image shows Mike holding a fish, represented by visual representation 306A, that Mike had just caught, while John's daughter, Sally, represented by visual representation 304A, is looking at Mike and the fish. The tree represented by visual representation 308A is merely a tree that was present in the background of the image. The image of FIG. 3A may be the image that John's apparatus captured, with focus of each of the visual representations, such that no particular emphasis of any particular visual representation is perceivable.

In this example scenario, the visual representations of the image may have different importance to different people viewing the image. For example, John may enjoy the image's depiction of John's friend Mike and John's daughter Sally. It may be desirable to modify the image of FIG. 3A so that the image emphasizes visual representation in accordance with John's desires. For example, an apparatus may generate a modified version of the image for John to view. However, Mike may enjoy the image's depiction of himself holding the fish he had just caught. It may be desirable to modify the image of FIG. 3A so that the image emphasizes visual representation in accordance with Mike's desires. For example, an apparatus may generate a modified version of the image for Mike to view.

FIG. 3B may be indicative an image that an apparatus may generate for John from the image of FIG. 3A. The apparatus may identify John as an intended viewer of the image. For example, the apparatus may be John's apparatus, and the apparatus may generate the image based, at least in part, on a presumption that John will be the viewer of the image. The apparatus may determine that visual representation 306A is relevant based, at least in part, on the central role of the fish in the image. For example, the apparatus may determine that the role of the fish in the image may be important, and may determine that the visual representation of the fish should be emphasized. The apparatus may identify Mike as the object represented by visual representation 302A. The apparatus may utilize information indicating that Mike is John's friend to determine that the visual representation of Mike should be emphasized. The apparatus may identify Sally as the object represented by visual representation 304A. The apparatus may utilize information indicating that Sally is John's daughter to determine that the visual representation of Sally should be emphasized. In this manner, the apparatus may determine to modify the image of FIG. 3A so that visual representations of Mike, Sally, and the fish are emphasized. The apparatus may modify the image of FIG. 3A to generate the image of FIG. 3B such that the visual representation of Mike, Sally, and the fish become emphasized by way of application of a bokeh effect on other objects in the image of FIG. 3A, such as the tree of visual representation 306A. In this manner, the image of FIG. 3B may be an image that the apparatus generated based, at least in part, on correlation between John's identity, and information indicative of a relationship with John and Mike, and a relationship between John and Sally.

FIG. 3C may be indicative an image that an apparatus may generate for Mike from the image of FIG. 3A. The apparatus may identify Mike as an intended viewer of the image. For example, the apparatus may be John's apparatus, John may be sending a copy of the image to Mike, and the apparatus may generate the image based, at least in part, on identifying Mike as a recipient of the image. The apparatus may determine that visual representation 306A is relevant based, at least in part, on the central role of the fish in the image. For example, the apparatus may determine that the role of the fish in the image may be important, and may determine that the visual representation of the fish should be emphasized. The apparatus may identify Mike as the object represented by visual representation 302A. The apparatus may determine that the visual representation of Mike should be emphasized based, at least in part, on correlation between the object and the intended viewer. The apparatus may identify Sally as the object represented by visual representation 304A. The apparatus may be unable to find information indicating that Sally has any relevant relationship with Mike such that the apparatus may determine that the visual representation of Sally should not be emphasized. In this manner, the apparatus may determine to modify the image of FIG. 3A so that visual representations of Mike and the fish are emphasized. The apparatus may modify the image of FIG. 3A to generate the image of FIG. 3C such that the visual representation of Mike and the fish become emphasized by way of application of a bokeh effect on other objects in the image of FIG. 3A, such as Sally and the tree of visual representation 306A. In this manner, the image of FIG. 3C may be an image that the apparatus generated based, at least in part, on correlation between Mike's identity and information indicative of a relationship with John and Mike, and correlation between Mike's identity and information indicative of a lack of relationship between Sally and Mike.

Figure 4A:
FIGS. 4A-4C are diagrams illustrating visual media items according to at least one example embodiment.
Figure 4B:
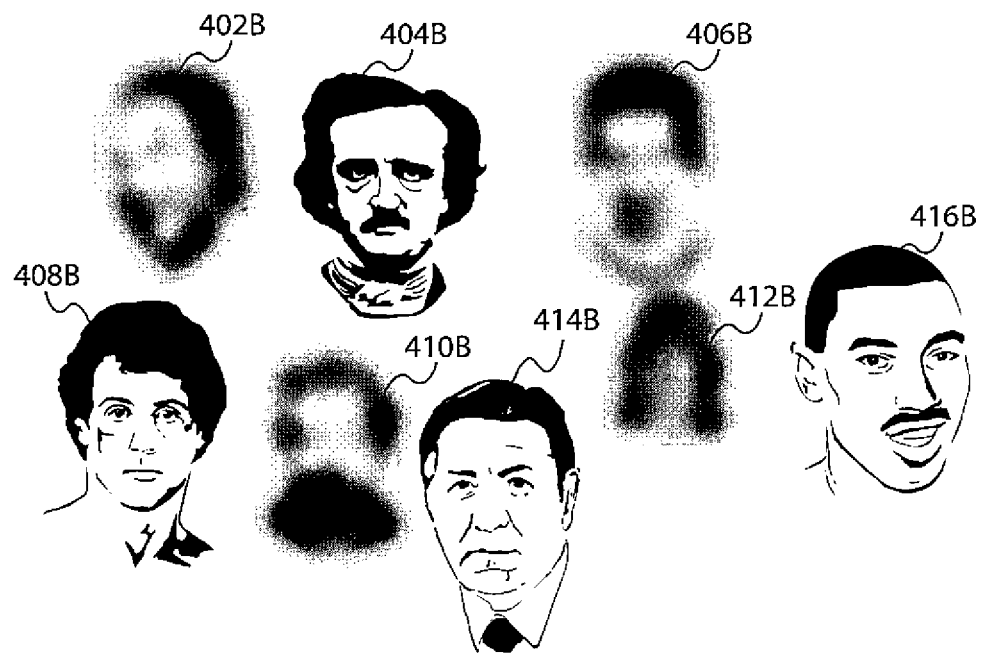
Figure 4C:
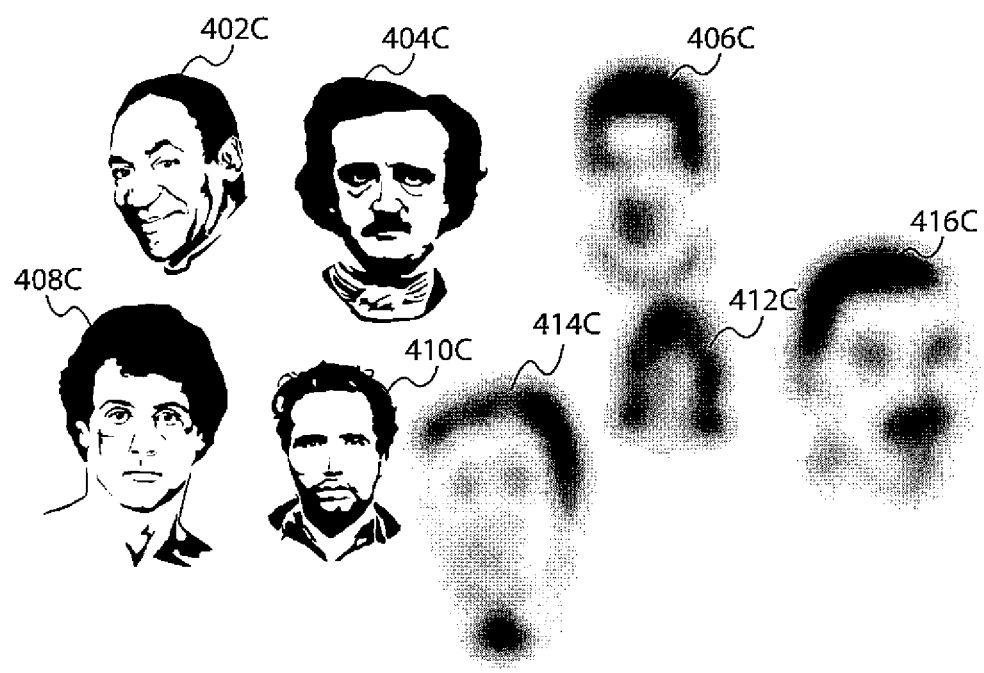

FIGS. 4A-4C are diagrams illustrating visual media items according to at least one example embodiment. The examples of FIGS. 4A-4C are merely examples and do not limit the scope of the claims. For example, visual representations may vary, number of objects may vary, proportionality of the visual media item may vary, and/or the like.

When the apparatus is determining a relationship between an intended viewer and an object, the apparatus may utilize a diverse set of information to assess such a relationship when the object is a person. For example, the apparatus may utilize information indicative of a relationship between the intended viewer and the person based on information that may be available regarding the relationship with respect to the intended viewer, with respect to the person, and/or the like.

In some circumstances, the apparatus may comprise information indicative of a relationship between an intended viewer and an object representation in the visual media item. For example, the apparatus may comprise a list of contacts, a profile, a communication history, and/or the like. In this manner, when the identity of the intended viewer relates to a user of the apparatus the contact information may relate to contact information comprised by a contact list associated with the apparatus. In such an example, the presence of the contact information on the apparatus of the intended viewer may be information indicative of a relationship between the user and a person represented by the contact information.

In some circumstances, it may be desirable for an apparatus to receive information form a separate apparatus to aid in modification of a visual media item. The apparatus may be similar to apparatus 222 of FIG. 2B, and the separate apparatus may be similar to apparatus 226 of FIG. 2B. For example, the external apparatus may comprise information associated with an identity of an intended viewer, information indicative of a relationship between the intended viewer and an object of the image, and/or the like. For example, the separate apparatus may be a social networking server that comprises information associated with a social networking account of the intended viewer. In such an example, the apparatus may receive information from the social networking server that indicates presence or absence of a relationship between the intended viewer and one or more objects represented in the visual media item. Such utilization of the separate apparatus may be desirable for, at least the purpose of, utilizing data that the intended viewer may have established throughout his social networking interactions so that the determination of relationships for purposes of visual media item modification may benefit from the intended viewer's previous interactions. In another example, the separate apparatus may be a corporate repository, such as an organizational database. In this manner, the apparatus may utilize the corporate repository to determine working relationships between an intended viewer and one or more people that may be represented in the visual media item.

In at least one example embodiment, the identity of the viewer relates to a social networking account designation. The social networking account designation may be a screen name, a user name, an account identifier, and/or the like, that identifies a particular social networking account as a social networking account of the intended viewer. In such an example the apparatus may receive information indicative of a social connection between the identity and the person. For example, the information indicative of the social connection relates to contact information associated with the social networking account. Such information may be received from a social networking server.

In some circumstances, there may be information associated with the intended viewer that explicitly indicates a relationship between the intended viewer and one or more objects. For example, there may be profile information associated with the identity of the intended viewer. In such an example, profile information relates to information indicative of preferences in relation to one or more objects. For example, the profile information may indicate that the intended viewer likes a particular sport. Such information may be utilized to determine relevance of objects that may relate to that sport. Similarly, such information may be utilized to identify particular people that may be relevant to the profile information, such as colleagues, favorite celebrities, and/or the like.

FIG. 4A is a diagram illustrating a visual media item according to at least one example embodiment. It can be seen that the visual media item of FIG. 4A comprises visual representation 402A of a person, visual representation 404A of a person, visual representation 406A of a person, visual representation 408A of a person, visual representation 410A of a person, visual representation 412A of a person, visual representation 414A of a person, and visual representation 416A of a person. It can be seen that each of the visual representations 402A, 404A, 406A, 408A, 410A, 412A, 414A, and 416A are in focus. In this manner, the visual media item of FIG. 4A may comprise hyperfocal visual content.

FIG. 4B is a diagram illustrating a visual media item according to at least one example embodiment. FIG. 4B represents a changed version of the visual media item of FIG. 4A. In the example of FIG. 4B, visual representation 402B is based, at least in part, on visual representation 402A, visual representation 404B is based, at least in part, on visual representation 404A, visual representation 406B is based, at least in part, on visual representation 406A, visual representation 408B is based, at least in part, on visual representation 408A, visual representation 410B is based, at least in part, on visual representation 410A, visual representation 412B is based, at least in part, on visual representation 412A, visual representation 414B is based, at least in part, on visual representation 414A, visual representation 416B is based, at least in part, on visual representation 416A. It can be seen that visual representations 404B, 408B, 414B, and 416B are emphasized in FIG. 4B by way of application of a bokeh effect on visual representations 402B, 406B, 410B, and 412B. In this manner, a viewer may perceive emphasis of visual representations 404B, 408B, 414B, and 416B.

FIG. 4C is a diagram illustrating a visual media item according to at least one example embodiment. FIG. 4C represents a changed version of the visual media item of FIG. 4A. In the example of FIG. 4C, visual representation 402C is based, at least in part, on visual representation 402A, visual representation 404C is based, at least in part, on visual representation 404A, visual representation 406C is based, at least in part, on visual representation 406A, visual representation 408C is based, at least in part, on visual representation 408A, visual representation 410C is based, at least in part, on visual representation 410A, visual representation 412C is based, at least in part, on visual representation 412A, visual representation 414C is based, at least in part, on visual representation 414A, visual representation 416C is based, at least in part, on visual representation 416A. It can be seen that visual representations 402C, 404C, 408C, and 410C are emphasized in FIG. 4C by way of application of a bokeh effect on visual representations 406C, 412C, 414C, and 416C. In this manner, a viewer may perceive emphasis of visual representations 402C, 404C, 408C, and 410C.

To aid in clarification of possible scenarios where an apparatus may generate a modified visual representation, such as illustrated in FIGS. 4B and 4C, an example scenario will be described. However, it should be understood that such scenario is intended merely to clarify circumstances where such modification may be desirable, and does not necessarily limit the claims in any way. The images of FIG. 4A may be an image of a group of people at an event, such as a party. The image may be available to multiple viewers, for example, on a website. When different viewers view the image on their apparatuses, their apparatuses may modify the image to emphasize different people based, at least in part, on a relationship between the viewer and the people. These examples relate to viewers Jim and Bill. In such examples, there may be information indicative of a relationship between Jim and Bill, or there may be absence of information indicative of a relationship between Jim and Bill.

For example, Jim may receive the image of FIG. 4A, and Jim's apparatus may modify the image of FIG. 4A to generate the image of FIG. 4B based, at least in part, on information indicative of a relationship between Jim and the people represented in the image. For example, Jim's apparatus may utilize information indicative of a social connection between Jim and the people represented in the image. In this manner, Jim may have no social relationship with the people of visual representations 402A, 406A, 410A, and 412A, so that the apparatus generates the image of FIG. 4B to de-emphasize these people in visual representations 402B, 406B, 410B, and 412B. In this manner, the apparatus may cause the visual representations of 404B, 408B, 414B, and 416B to be emphasized in the image of FIG. 4B. The emphasized representation may represent people with whom Jim has a social relationship, as indicated by social networking information. In this example, the people represented by visual representations 404B, 408B, 414B, and 416B may relate to Jim's friends, colleagues, and/or the like.

In another example, Bill may receive the image of FIG. 4A, and Bill's apparatus may modify the image of FIG. 4A to generate the image of FIG. 4C based, at least in part, on information indicative of a relationship between Bill and the people represented in the image. For example, Bill's apparatus may utilize information indicative of a social connection between Bill and the people represented hi the image. In this manner, Bill may have no social relationship with the people of visual representations 406A, 412A, 414A, and 416A, so that the apparatus generates the image of FIG. 4C to de-emphasize these people in visual representations 406C, 412C, 414C, and 416C. In this manner, the apparatus may cause the visual representations of 402C, 404C, 408C, and 410C to be emphasized in the image of FIG. 4C. The emphasized representation may represent people with whom Bill has a social relationship, as indicated by social networking information. In this example, the people represented by visual representations 402C, 404C, 408C, and 410C may relate to Bill's friends, colleagues, and/or the like.

Figure 5:
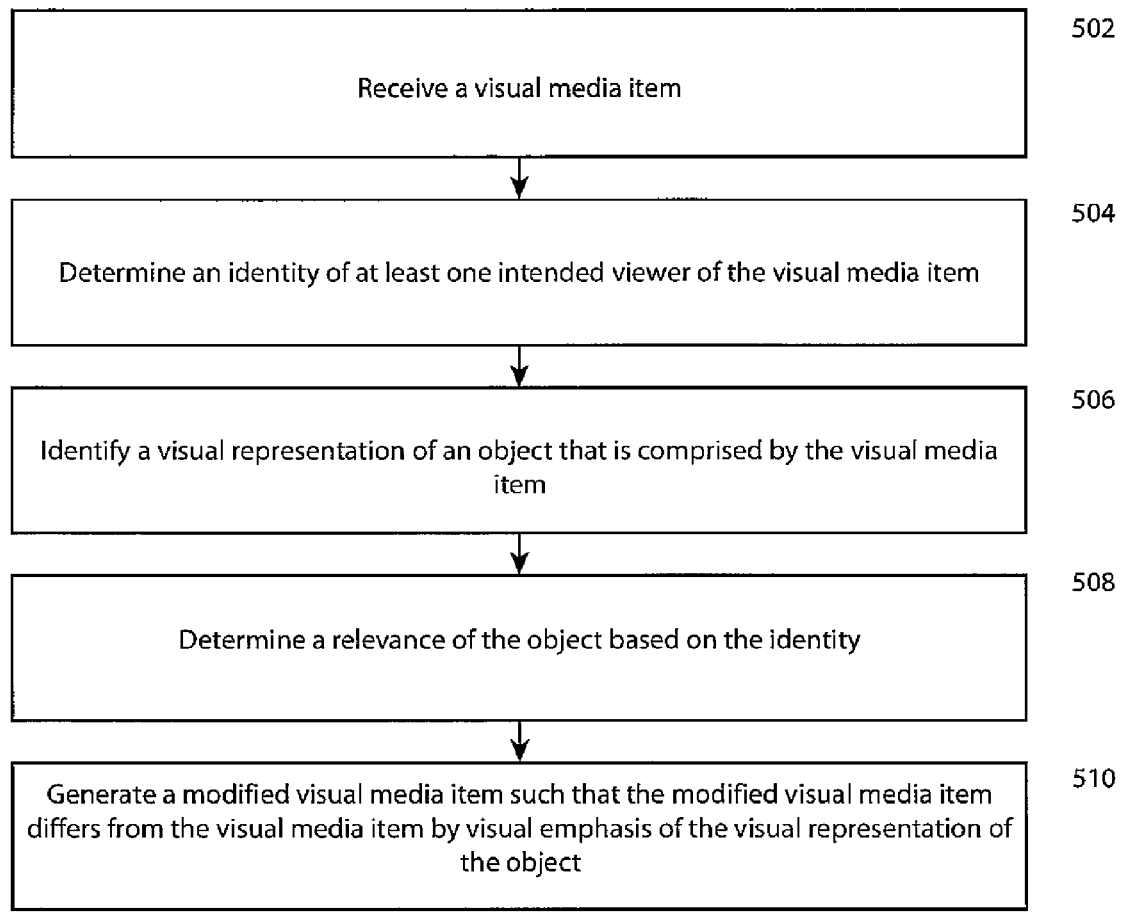
FIG. 5 is a flow diagram illustrating activities associated with a modified visual media item according to at least one example embodiment.

FIG. 5 is a flow diagram illustrating activities associated with a modified visual media item according to at least one example embodiment. In at least one example embodiment, there is a set of operations that corresponds with the activities of FIG. 5. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 5.

At block 502, the apparatus receives a visual media item. The receipt and the visual media item may be similar as described regarding FIGS. 2A-2B, FIGS. 3A-3C, and/or the like.

At block 504, the apparatus determines an identity of at least one intended viewer of the visual media item. The determination, the identity, and the intended viewer may be similar as described regarding FIGS. 3A-3C, FIGS. 4A-4C, FIG. 6, FIG. 7, and/or the like.

At block 506, the apparatus identifies a visual representation of an object that is comprised by the visual media item. The identification, the visual representation, and the object may be similar as described regarding FIGS. 3A-3C, FIGS. 4A-4C, and/or the like.

At block 508, the apparatus determines a relevance of the object based, at least in part, on the identity of the intended viewer. The determination and the relevance may be similar as described regarding FIGS. 3A-3C, FIGS. 4A-4C, and/or the like.

At block 510, the apparatus generates a modified visual media item such that the modified visual media item differs from the visual media item, at least, by visual emphasis of the visual representation of the object. The generation, the modified visual media item, the difference, and the visual emphasis may be similar as described regarding FIGS. 3A-3C, FIGS. 4A-4C, and/or the like.

Figure 6:
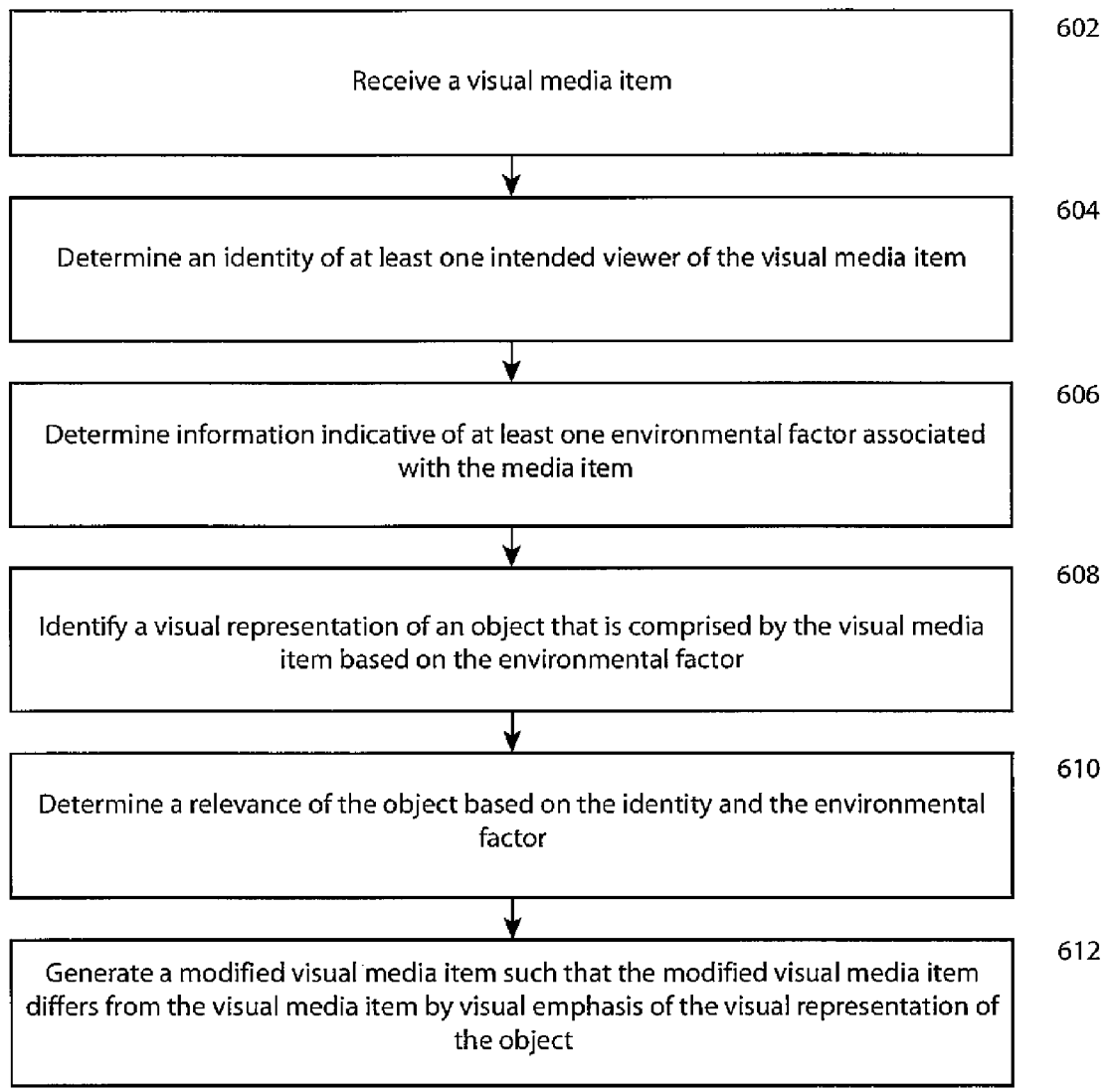
FIG. 6 is a flow diagram illustrating activities associated with a modified visual media item according to at least one example embodiment.

FIG. 6 is a flow diagram illustrating activities associated with a modified visual media item according to at least one example embodiment. In at least one example embodiment, there is a set of operations that corresponds with the activities of FIG. 6. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 6.

In some circumstances, it may be desirable for the relevance of an object to an intended viewer to be dynamic. For example, it may be desirable for the relevance to desirable for the relevance to be based, at least in part, on the user's context at the time of viewing. It may be desirable for the apparatus to determine relevance based, at least in part, on environmental factors that indicate an activity, or current circumstances of the intended viewer and/or the apparatus. For example, objects related to the user's current and/or recent activity may be determined to be relevant. In such an example, if the user is/has been running, visual objects related to sporting goods, sport activities, sport buddies, and/or the like may be determined to be relevant. In another example, objects related to user's current/recent environment may be determined to be relevant. For example, if the user has been visiting guitar shops, objects relating to guitars may be determined to be relevant.

In at least one example embodiment, the apparatus determines information indicative of at least one environmental factor associated with the visual media item. The environmental factor may relate to the circumstances of the intended viewer, the circumstances of the visual media item, and/or the like. For example, the apparatus may determine the information indicative of the environmental factor associated with the visual media item by retrieving metadata associated with the visual media item. Such metadata may be stored with the visual media item. The metadata may indicate where the visual media item was recorded, when the visual media item was recorded, and/or the like. The apparatus may compare such metadata information to the environmental factors of the user for object identification, for relevance determination, and/or the like.

In some circumstances, the apparatus may determine environmental factors based, at least in part, on information received from sensors. For example, the intended viewer may be a user of the apparatus. In such an example, the apparatus may use the environmental factor as information indicative of a relationship between the user and an object. The sensors may be similar as described regarding FIG. 1. For example, the apparatus may determine an environmental factor based, at least in part, on accelerometer information, light sensor information, global position system information, cellular network identifier information, wireless local area network identifier information, magnetometer information, gyroscopic information, microphone information, camera information, and/or the like. The apparatus may utilize such information to determine an activity, a location, and/or the like. For example, the apparatus may determine that the environmental factors indicate that the intended viewer is walking, running, in a car, at a particular geographic location, and/or the like.

In at least one example embodiment, the determination of the information indicative of the environmental factor associated with the visual media item comprises receipt of sensor information indicative of the environmental factor. The environmental factor may relate to a geographical position, a direction, and/or the like. In at least one example embodiment, the identification of the visual representation of the object is based, at least in part, on the environmental factor. In at least one example embodiment, the determination of the relevance of an object is based, at least in part, on the environmental factor.

In at least one example embodiment, the apparatus determines that an object corresponds with at least one point of interest associated with the environmental factor. A point of interest may be a street, a building, or a landmark, and/or the like. For example, map information may comprise information indicative of one or more points of interest in association with one or more geographical locations. The apparatus may determine a relationship between the geographical location of the apparatus and the point of interest. In some circumstances, the apparatus may determine a relationship between the geographical location of the apparatus and the point of interest based, at least in part, on a direction of the apparatus. For example, the apparatus may be at a location facing a direction that allows for perception of the point of interest. In at least one example embodiment, the identification of the visual representation of the object is based, at least in part, on the determination that the object corresponds with at least one point of interest associated with the environmental factor.

At block 602, the apparatus receives a visual media item, similarly as described regarding block 502 of FIG. 5. At block 604, the apparatus determines an identity of at least one intended viewer of the visual media item, similarly as described regarding block 504 of FIG. 5.

At block 606, the apparatus determines information indicative of at least one environmental factor associated with the visual media item.

At block 608, the apparatus identifies a visual representation of an object that is comprised by the visual media item based, at least in part, on the environmental factor. The identification, the visual representation, and the object may be similar as described regarding FIGS. 3A-3C, FIGS. 4A-4C, and/or the like.

At block 610, the apparatus determines a relevance of the object based, at least in part, on the identity of the intended viewer and the environmental factor. The determination and the relevance may be similar as described regarding FIGS. 3A-3C, FIGS. 4A-4C, and/or the like.

At block 612, the apparatus generates a modified visual media item such that the modified visual media item differs from the visual media item, at least, by visual emphasis of the visual representation of the object, similarly as described regarding block 510 of FIG. 5.

Figure 7:
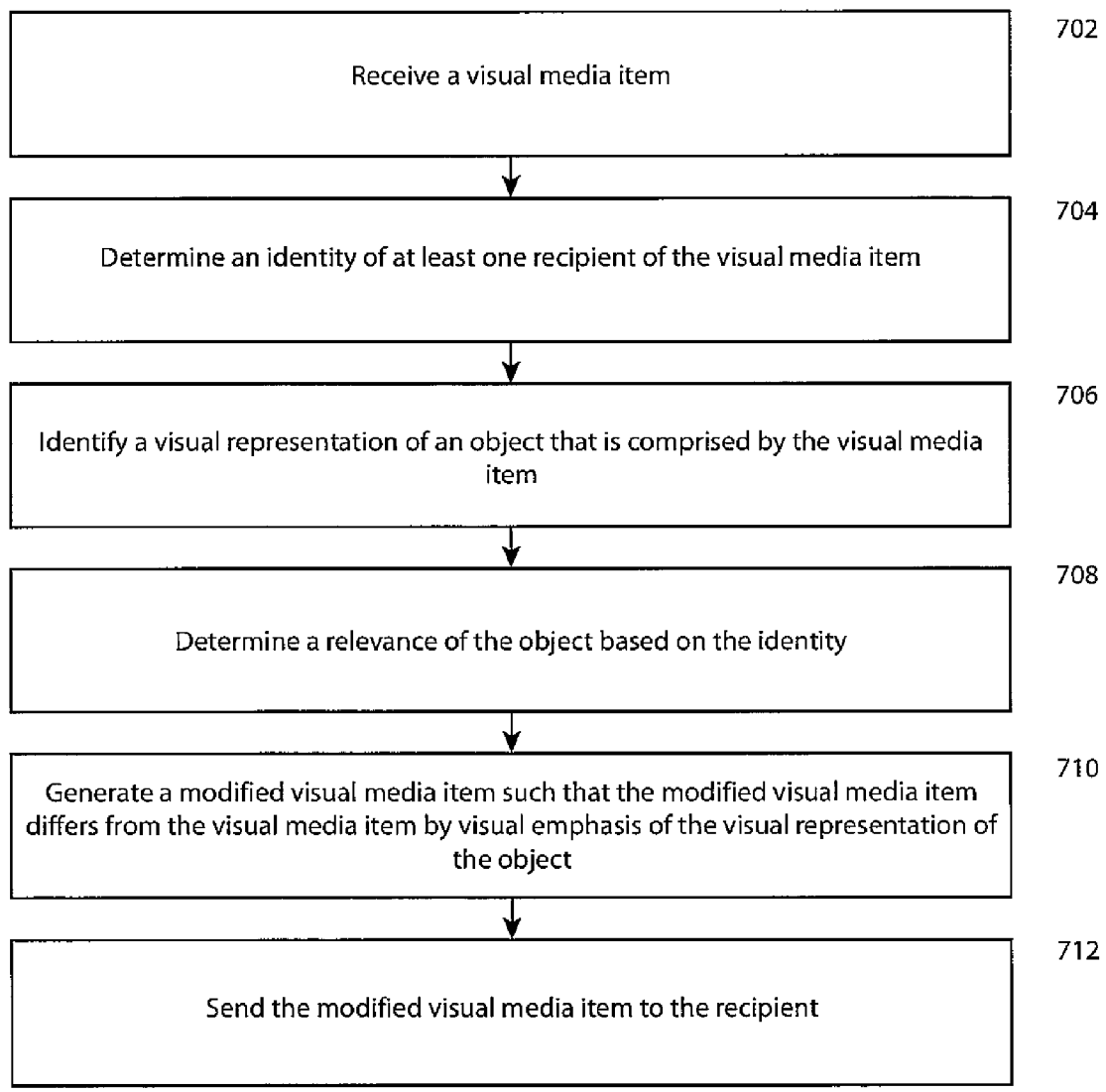
FIG. 7 is a flow diagram illustrating activities associated with a modified visual media item according to at least one example embodiment.

FIG. 7 is a flow diagram illustrating activities associated with a modified visual media item according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

As previously described, information may be exchanged from an apparatus of a user to a different apparatus of a different user, similarly as described regarding FIGS. 2A-2B. In such circumstances, an apparatus may send a visual media item to a user of a separate apparatus. In such circumstances, the user of the separate apparatus may desire the visual media item to be tailored to emphasize objects that are important to himself. For example, in relation to the example provided regarding FIGS. 3A-3C, John may send the visual media item to Mike. However, Mike may desire to view the visual media item of FIG. 3C instead of the visual media item of FIG. 3A or the visual media item of FIG. 3B. In such an example, it may be desirable for Mike's apparatus to receive the visual media item of FIG. 3A, and to automatically generate the visual media item of FIG. 3C. In another example, it may be desirable for John's apparatus to generate and send the visual media item of FIG. 3C to Mike's apparatus. For example, Mike's apparatus may be incapable of generating the visual media item of FIG. 3C from the visual media item of FIG. 3A. However, in some circumstances, it may be desirable to send the unmodified visual media item to the recipient. For example the recipient may desire to perform different modifications to the unmodified visual media item, may desire to compare the modified visual media item to the unmodified visual media item, and/or the like.

In at least one example embodiment, the apparatus determines an intended viewer of the visual media item to be a recipient of the visual media item. For example, the apparatus may determine the identity of the intended viewer based, at least in part, on the identity of the recipient.

At block 702, the apparatus receives a visual media item, similarly as described regarding block 502 of FIG. 5.

At block 704, the apparatus determines an identity of at least one recipient of the visual media item. For example the apparatus may evaluate a designated recipient for the visual media item to determine the recipient is an intended viewer of the visual media item. The determination, the identity, and the intended viewer may be similar as described regarding FIGS. 3A-3C, FIGS. 4A-4C, FIG. 6, FIG. 7, and/or the like.

At block 706, the apparatus identifies a visual representation of an object that is comprised by the visual media item, similarly as described regarding block 506 of FIG. 5.

At block 708, the apparatus determines a relevance of the object based, at least in part, on the identity of the recipient. The determination and the relevance may be similar as described regarding FIGS. 3A-3C, FIGS. 4A-4C, and/or the like.

At block 710, the apparatus generates a modified visual media item such that the modified visual media item differs from the visual media item, at least, by visual emphasis of the visual representation of the object, similarly as described regarding block 510 of FIG. 5.

At block 712, the apparatus sends the modified visual media item to the recipient. The sending may be similar as described regarding FIGS. 2A-2B.

Figure 8:
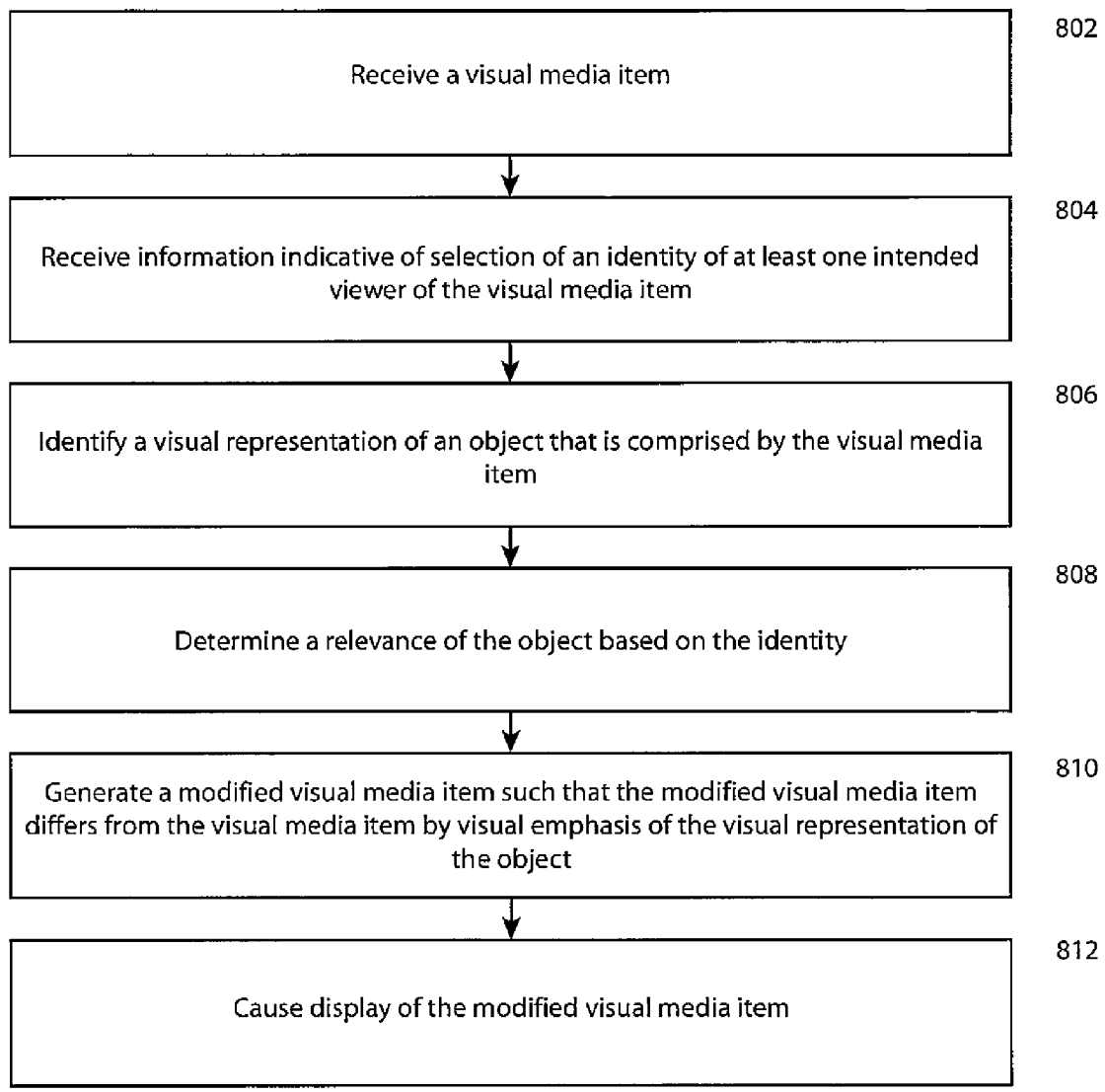
FIG. 8 is a flow diagram illustrating activities associated with a modified visual media item according to at least one example embodiment.

FIG. 8 is a flow diagram illustrating activities associated with a modified visual media item according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

In some circumstances, it may be desirable for a user of an apparatus to view a visual media item as it would be viewed by an intended viewer. For example, in relation to the example of FIGS. 3A-3C, John may desire to view the visual media item of FIG. 3C to see the modifications that Mike would see. Therefore, it may be desirable for the apparatus to allow a user to designate an intended viewer of a visual media item. In this manner, the user may be able to cause the apparatus to generate one or more modified visual media items based, at least in part, on the designation of one or more intended viewers.

At block 802, the apparatus receives a visual media item, similarly as described regarding block 502 of FIG. 5.

At block 804, the apparatus receives information indicative of an input that designates the identity of an intended viewer of the visual media item. In at least one example embodiment, the input relates to selection of an interface item associated with the identity. The interface item may be any selectable interface element that allows for designation of a particular identity, or group of identities. For example, the interface item may be a contact interface item associated with the intended viewer. In at least one example embodiment, a contact interface item is an interface item that may be selected for access to contact information. In another example, the interface item may be an image of the intended viewer. In such an example, the image of the intended viewer may be comprised by the visual media item. For example, the input may involve user touching and holding on a representation of a person in the visual media item to identify an intended viewer of the visual media item. In this manner, the input may relate to selection of a part of the visual media item that corresponds with a visual representation of the identity. In another example, the input may involve the user dragging an image of a person, for example from a contact book, on top of the visual media item. In this manner, the selection may relate to a drag input indicative of dragging the interface item to a position that corresponds with a position of the displayed visual media item. In another example, the input may involve the user flipping the image from its corner, as if turning a page in a book. In such an example, the apparatus may provide a sequence of images with different emphasis representations for different intended viewers.

At block 806, the apparatus identifies a visual representation of an object that is comprised by the visual media item, similarly as described regarding block 506 of FIG. 5. At block 808, the apparatus determines a relevance of the object based, at least in part, on the identity of the intended viewer, similarly as described regarding block 508 of FIG. 5. At block 810, the apparatus generates a modified visual media item such that the modified visual media item differs from the visual media item, at least, by visual emphasis of the visual representation of the object.

At block 812, the apparatus causes display of the modified visual media item. Causation of display may comprise displaying the modified visual media item, sending information indicative of the visual media item to a separate apparatus to be displayed, and/or the like.

Figure 9:
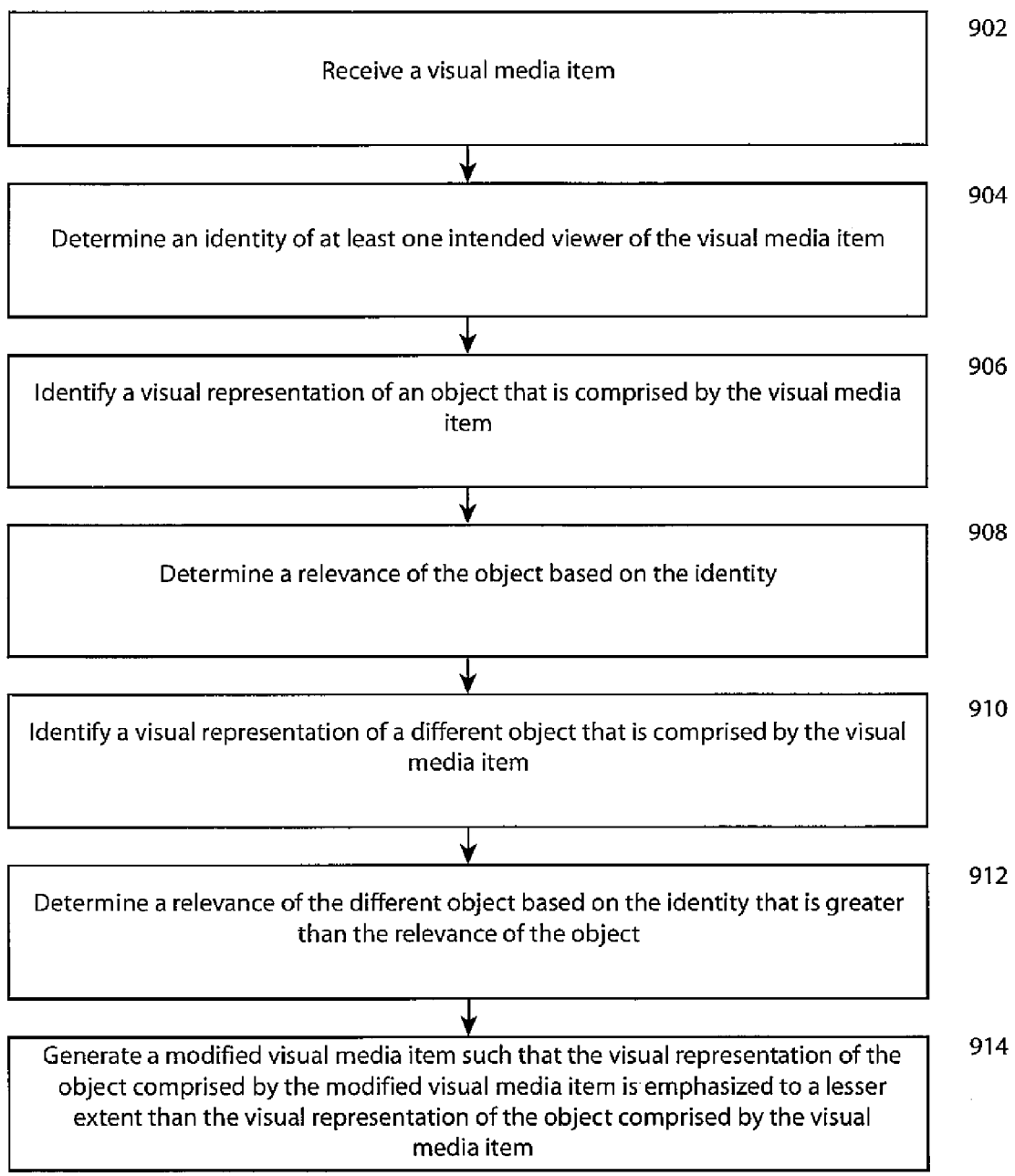
FIG. 9 is a flow diagram illustrating activities associated with a modified visual media item according to at least one example embodiment.

FIG. 9 is a flow diagram illustrating activities associated with a modified visual media item according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

In at least one example embodiment, the apparatus may identify multiple visual representations of objects in a visual media item. For example, the apparatus may identify visual representations 302A, 304A, 306A, and 308A of the visual media item of FIG. 3A. In such an example, the apparatus may determine different relevances for the various objects. In some circumstances, causing emphasis of an interface element may comprise causing de-emphasis of a different interface element. For example, the visual media item of FIG. 3C emphasizes the objects of visual representations 302C and 306C by way of de-emphasis of the objects of visual representations 304C and 308C. As previously described, the amount of emphasis of a particular visual representation may depend upon relevance of a different interface element. For example, emphasis of a representation of an object may be based, at least in part, on a comparison between relevance of the object of the visual representation and relevance of a different object. In some circumstances, an object having a greater relevance than another object may have an associated visual representation that is modified to be emphasized to a greater extent than represented in the unmodified visual media item. For example, in the modified visual media item of FIG. 3B, the relevance of the object of visual representation 302B may be greater than the relevance of the object of visual representation 308B. It can be seen that the de-emphasis of visual representation 308B from emphasis of visual representation 308A (as depicted in the unmodified visual media item of FIG. 3A) results in visual representation 302B being emphasized to a greater extent than visual representation 302A (as depicted in the unmodified visual media item of FIG. 3A). In this manner, de-emphasis of visual representation 308B has resulted in visual representation 302B being emphasized to a greater extent, even though visual representation 302B may be similar, or even the same as, visual representation 302A.

At block 902, the apparatus receives a visual media item, similarly as described regarding block 502 of FIG. 5. At block 904, the apparatus determines an identity of at least one intended viewer of the visual media item, similarly as described regarding block 504 of FIG. 5. At block 906, the apparatus identifies a visual representation of an object that is comprised by the visual media item, similarly as described regarding block 506 of FIG. 5. At block 908, the apparatus determines a relevance of the object based, at least in part, on the identity of the intended viewer, similarly as described regarding block 508 of FIG. 5.

At block 910, the apparatus identifies a visual representation of a different object that is comprised by the visual media item. The identification, the visual representation, and the different object may be similar as described regarding FIGS. 3A-3C, FIGS. 4A-4C, and/or the like.

At block 912, the apparatus determines a relevance of the different object based, at least in part, on the identity of the intended viewer to be greater than the relevance of the object. The determination and the relevance may be similar as described regarding FIGS. 3A-3C, FIGS. 4A-4C, and/or the like.

At block 914, the apparatus generates a modified visual media item such that the visual representation of the object comprised by the modified visual media item is emphasized to a lesser extent than the visual representation of the object comprised by the visual media item. The generation, the modified visual media item, the difference, and the visual emphasis may be similar as described regarding FIGS. 3A-3C, FIGS. 4A-4C, and/or the like.

Figure 10:
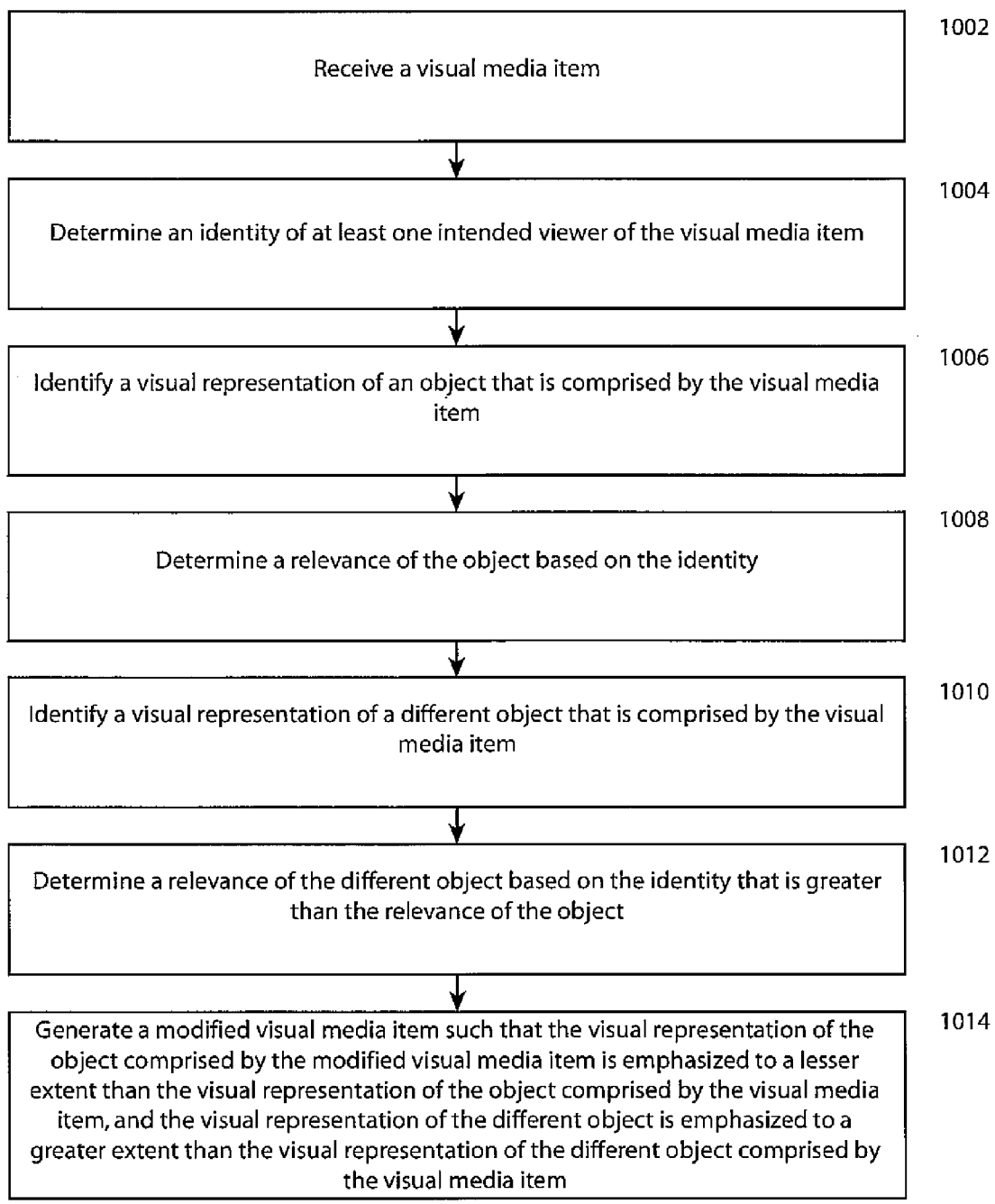
FIG. 10 is a flow diagram illustrating activities associated with a modified visual media item according to at least one example embodiment.

FIG. 10 is a flow diagram illustrating activities associated with a modified visual media item according to at least one example embodiment. In at least one example embodiment, there is a set of operations that corresponds with the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10.

At block 1002, the apparatus receives a visual media item, similarly as described regarding block 502 of FIG. 5. At block 1004, the apparatus determines an identity of at least one intended viewer of the visual media item, similarly as described regarding block 504 of FIG. 5. At block 1006, the apparatus identifies a visual representation of an object that is comprised by the visual media item, similarly as described regarding block 506 of FIG. 5. At block 1008, the apparatus determines a relevance of the object based, at least in part, on the identity of the intended viewer, similarly as described regarding block 508 of FIG. 5.

At block 1010, the apparatus identifies a visual representation of a different object that is comprised by the visual media item, similarly as described regarding block 910 of FIG. 9. At block 1012, the apparatus determines a relevance of the different object based, at least in part, on the identity of the intended viewer to be greater than the relevance of the object, similarly as described regarding block 912 of FIG. 9.

At block 1014, the apparatus generates a modified visual media item such that the visual representation of the object comprised by the modified visual media item is emphasized to a lesser extent than the visual representation of the object comprised by the visual media item and the visual representation of the different object comprised by the modified visual media item is emphasized to a greater extent than the visual representation of the different object comprised by the visual media item. The generation, the modified visual media item, the difference, and the visual emphasis may be similar as described regarding FIGS. 3A-3C, FIGS. 4A-4C, and/or the like. For example, the apparatus may apply a bokeh effect to the visual representation of the object to emphasize the different object, and may apply a brightening effect to the visual representation of the different object to emphasize the different object.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 504 of FIG. 5 may be performed after block 506. Furthermore, if desired, one or more of the above-described functions may be optional or may be combined. For example, block 506 of FIG. 5 may be optional and/or combined with block 508.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
   at least one processor;
   at least one memory including computer program code, the memory and the computer program code configured to, working with the processor, cause the apparatus to perform at least the following:
   receive a visual media item;
   determine an identity of at least one intended viewer of the visual media item;
   identify a visual representation of an object that is comprised by the visual media item;
   determine a relevance of the object based, at least in part, on the identity wherein the relevance relates to a correlation of the object to information indicative of a relationship between the identity and the object; and
   generate, responsive to the determined relevance, a modified visual media item such that a depth of field of the modified visual media item differs from the depth of field of the visual media item.

2. The apparatus of claim 1, wherein the difference in the depth of field of the modified visual media item to that of the visual media item is such that the visual representation of the object comprised by the modified visual media item is emphasized to a greater extent than the visual representation of the object comprised by the visual media item.

3. The apparatus of claim 1, wherein the visual media item comprises a plurality of images captured at differing depths of field.

4. The apparatus of claim 1, wherein the memory includes computer program code ,configured to, working with the processor, cause the apparatus to perform determination of information indicative of at least one environmental factor associated with the visual media item, wherein at least one of the identification of the object or determination of relevance of the object is based, at least in part, on the environmental factor.

5. The apparatus of claim 1, wherein the memory includes computer program code configured to, working with the processor, cause the apparatus to perform sending the modified visual media item to a recipient, wherein the intended viewer is the recipient.

6. The apparatus of claim 1, wherein determination of the identity comprises receipt of information indicative of an input that designates the identity.

7. The apparatus of claim 1, wherein the memory includes computer program code configured to, working with the processor, cause the apparatus to perform:
identification of a visual representation of a different object; and
identification of a different relevance of the different object based, at least in part, on the identity, wherein the different relevance is greater than the relevance, and wherein the visual representation of the object comprised by the modified visual media item is emphasized to a lesser extent than the visual representation of the object comprised by the visual media item.

8. The apparatus of claim 7, wherein generation of the modified visual media item is performed such that the modified visual media item differs from the visual media item, at least, by visual emphasis of the visual representation of the different object being emphasized to a greater extent than the visual representation of the different object comprised by the visual media item.

9. A mobile communications device comprising the apparatus of claim 1 and a display configured to display at least one of the media item or the modified media item.

10. A method comprising:
receiving a visual media item;
determining an identity of at least one intended viewer of the visual media item;
identifying a visual representation of an object that is comprised by the visual media item;
determining a relevance of the object based, at least in part, on the identity wherein the relevance relates to a correlation of the object to information indicative of a relationship between the identity and the object; and
generating, responsive to the determined relevance, a modified visual media item such that a depth of field of the modified visual media item differs from the depth of field of the visual media item.

11. The method of claim 10, wherein the difference in the depth of field of the modified visual media item to that of the visual media item is such that the visual representation of the object comprised by the modified visual media item is emphasized to a greater extent than the visual representation of the object comprised by the visual media item.

12. The method of claim 10, wherein the visual media item comprises a plurality of images captured at differing depths of field.

13. The method of claim 10, further comprising determination of information indicative of at least one environmental factor associated with the visual media item, wherein at least one of the identification of the object or determination of relevance of the object is based, at least in part, on the environmental factor.

14. The method of claim 10, further comprising sending the modified visual media item to a recipient, wherein the intended viewer is the recipient.

15. The method of claim 10, wherein determination of the identity comprises receipt of information indicative of an input that designates the identity.

16. The method of claim 10, further comprising:
identification of a visual representation of a different object; and
identification of a different relevance of the different object based, at least in part, on the identity, wherein the different relevance is greater than the relevance, and wherein the visual representation of the object comprised by the modified visual media item is emphasized to a lesser extent than the visual representation of the object comprised by the visual media item.

17. At least one non-transitory computer-readable medium encoded with instructions that, when executed by a processor, perform:
receiving a visual media item;
determining an identity of at least one intended viewer of the visual media item;
identifying a visual representation of an object that is comprised by the visual media item;
determining a relevance of the object based, at least in part, on the identity wherein the relevance relates to a correlation of the object to information indicative of a relationship between the identity and the object; and
generating, responsive to the determined relevance, a modified visual media item such that a depth of field of the modified visual media item differs from the depth of field of the visual media item.

18. The non-transitory medium of claim 17, wherein the difference in the depth of field of the modified visual media item to that of the visual media item is such that the visual representation of the object comprised by the modified visual media item is emphasized to a greater extent than the visual representation of the object comprised by the visual media item.

19. The non-transitory medium of claim 18, wherein the visual media item comprises a plurality of image captured at differing depths of field.

20. The non-transitory medium of claim 17, wherein the medium is further encoded with instructions that, when executed by the processor, perform determination of information indicative of at least one environmental factor associated with the visual media item, wherein at least one of the identification of the object or determination of relevance of the object is based, at least in part, on the environmental factor.

* * * * *